United States Patent [19]
Mayo et al.

[11] Patent Number: 5,473,064
[45] Date of Patent: Dec. 5, 1995

[54] HYDROXYGALLIUM PHTHALOCYANINE IMAGING MEMBERS AND PROCESSES

[75] Inventors: James D. Mayo, Toronto; James M. Duff; Cheng K. Hsiao, both of Mississauga; Sandra J. Gardner, Willowdale; Barkev Keoshkerian, Thornhill, all of Canada

[73] Assignee: Xerox Corporation, Stamford, Conn.

[21] Appl. No.: 169,486

[22] Filed: Dec. 20, 1993

[51] Int. Cl.$^6$ .................................................. C09B 67/50
[52] U.S. Cl. .................................. 540/141; 540/140
[58] Field of Search ..................... 540/140, 141

[56] References Cited

U.S. PATENT DOCUMENTS

| | | | |
|---|---|---|---|
| 5,166,339 | 11/1992 | Duff et al. | 540/141 |
| 5,182,382 | 1/1993 | Mayo et al. | 540/141 |
| 5,189,155 | 2/1993 | Mayo et al. | 540/141 |
| 5,189,156 | 2/1993 | Mayo et al. | 540/143 |
| 5,302,710 | 4/1994 | Nukada et al. | 540/140 |

FOREIGN PATENT DOCUMENTS 1221459  9/1989  Japan.
2255980  11/1992  United Kingdom.

OTHER PUBLICATIONS

Linsky et al. Inorg. Chem 19, pp. 3131–3135, 1980.
Bull. Soc. Chim. Fr., 23 (1962) By Denise Colaitis, "No. 2–Study of Some Phthalocyanine Derivatives, Discussion on the Various Routes of Preparation, I–Phthalocyanines with Elements of Valence Greater Than Two".

*Primary Examiner*—Mukund J. Shah
*Assistant Examiner*—Pavanaram K. Sripada
*Attorney, Agent, or Firm*—E. O. Palazzo

[57] ABSTRACT

A process for the preparation of hydroxygallium phthalocyanine which comprises hydrolysis of halogallium phthalocyanine precursor to a hydroxygallium phthalocyanine, and conversion of said resulting hydroxygallium phthalocyanine to Type V hydroxygallium phthalocyanine by contacting said resulting hydroxygallium phthalocyanine with an organic solvent; and wherein said precursor halogallium phthalocyanine is obtained by the reaction of gallium halide with diiminoisoindolene in an organic solvent.

28 Claims, 10 Drawing Sheets

HYDROXYGALLIUM PHTHALOCYANINE IMAGING MEMBERS AND PROCESSES

BACKGROUND OF THE INVENTION

This invention is generally directed to hydroxygallium phthalocyanines, imaging members thereof, and processes for the preparation thereof; and, more specifically, the present invention is directed to processes for obtaining hydroxygallium phthalocyanines, polymorphs or crystal forms, including preferably Type V hydroxygallium phthalocyanine. In one embodiment, the present invention is directed to a process for the preparation of gallium phthalocyanines, especially Type V hydroxygallium phthalocyanines, by providing halo, especially chlorogallium phthalocyanines as illustrated herein; subsequently effecting hydrolysis thereof to a hydroxygallium phthalocyanine, especially Type I; and converting the hydroxygallium phthalocyanine obtained to Type V. The hydroxygallium phthalocyanines, especially the polymorph V, can be selected as an organic photogenerator pigment in photoresponsive imaging members containing charge, especially hole transport layers such as known aryl amine hole transport molecules. The aforementioned photoresponsive or photoconductive imaging members can be negatively charged when the photogenerating layer is situated between the hole transport layer and the substrate, or positively charged when the hole transport layer is situated between the photogenerating layer and the supporting substrate. The layered photoconductive imaging members can be selected for a number of different known imaging and printing processes including, for example, electrophotographic imaging processes, especially xerographic imaging and printing processes wherein negatively charged or positively charged images are rendered visible with toner compositions of the appropriate charge, which toners can be comprised of resin, pigment, charge additive and optional surface additives, reference, for example, U.S. Pat. Nos. 5,114,821; 4,937,157; 4,845,003; 4,904,762; 4,937,166 and 4,935,326, the disclosures of which are totally incorporated herein by reference. Generally, the imaging members are sensitive in the wavelength regions of from about 700 to about 850 nanometers, thus diode lasers can be selected as the light source.

Certain processes for the preparation of hydroxygallium phthalocyanine are known.

For example, in *Bull. Soc. Chim. Fr.*, 23 (1962), there is illustrated the preparation of hydroxygallium phthalocyanine via the precursor chlorogallium phthalocyanine. The precursor chlorogallium phthalocyanine is prepared by reaction of o-cyanobenzamide with gallium chloride in the absence of solvent. More specifically, o-cyanobenzamide is heated to its melting point (172° C.), and to it is added gallium chloride, at which time the temperature is increased to 210° C. for 15 minutes, and then cooled. The solid is recrystallized out of boiling chloronaphthalene to provide purple crystals having carbon, hydrogen and chlorine analyses matching theoretical values for chlorogallium phthalocyanine. Dissolution in concentrated sulfuric acid, followed by reprecipitation in diluted aqueous ammonia, affords a material having carbon and hydrogen analyses matching theoretical values for hydroxygallium phthalocyanine believed to be Type I with major peaks at 6.9, 13.1, 16.4, 21.0 and 26.4.

In JPLO 221459, there are illustrated gallium phthalocyanine compounds with the following intense diffraction peaks at Bragg angles (2 theta +/−0.2° ) in the X-ray diffraction spectrum:

1—6.7, 15.2, 20.5, 27.0;

2—6.7, 13.7, 16.3, 20.9, 26.3 (hydroxygallium phthalocyanine Type I); and

3—7.5, 9.5, 11.0, 13.5, 19.1, 20.3, 21.8, 25.8, 27.1, 33.0 (chlorogallium phthalocyanine Type I).

Further, there is illustrated in this publication a photoreceptor for use in electrophotography comprising a charge generation material and charge transport material on a conductive substrate, and wherein the charge generation material comprises one or a mixture of two or more of gallium phthalocyanine compounds with the following intense diffraction peaks at Bragg angles (2 theta +/−0.2°) in the X-ray diffraction spectrum:

1—6.7, 15.2, 20.5, 27.0;

2—6.7, 13.7, 16.3, 20.9, 26.3; and

3—7.5, 9.5, 11.0, 13.5, 19.1, 20.3, 21.8, 25.8, 27.1, 33.0.

In Mita EPO patent publication 314,100, there is illustrated the synthesis of certain, but different photogenerating of titanyl phthalocyanines (TiOPc) by, for example, the reaction of titanium alkoxides and diiminoisoindolene in quinoline or an alkylbenzene, and the subsequent conversion thereof to an alpha type pigment (Type II) by an acid pasting process, whereby the synthesized pigment is dissolved in concentrated sulfuric acid, and the resultant solution is poured onto ice to precipitate the alpha-form, which is filtered and washed with methylene chloride. One specific TiOPc pigment, which was blended with varying amounts of metal free phthalocyanine, could be selected as the charge generating layer in layered photoresponsive imaging members with a high photosensitivity at, for example, 780 nanometers.

In U.S. Pat. No. 4,728,592, there is illustrated, for example, the use of alpha type TiOPc (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta Type TiOPc (Type I) as a pigment, which is believed to provide a poor quality photoreceptor.

In Konica Japanese 64-17066/89, there is disclosed, for example, the crystal modification of TiOPc prepared from alpha type pigment (Type II) by milling it in a sand mill with salt and polyethylene glycol. This pigment had a strong XRPD peak at a value of 2 theta of 27.3 degrees. This publication also discloses that this new form differs from alpha type pigment (Type II) in its light absorption and shows a maximum absorbance at 817 nanometers compared to the alpha-type, which has a maximum at 830 nanometers. The XRPD shown in the publication for this new form is believed to be similar to that of Type IV titanyl phthalocyanine form described by Sanyo-Shikiso in JOP 63-20365. The aforementioned Konica publication also discloses the use of this new form of TiOPc in a layered electrophotographic device having high sensitivity to near infrared light of 780 nanometers. The new form is indicated to be superior to alpha type TiOPc (Type II). Further, this new form is also described in U.S. Pat. No. 4,898,799 and in a paper presented at the Annual Conference of Japan Hardcopy in July 1989. In this paper, this same new form is referred to as Type y, and reference is also made to Types I, II and III as A, B, and C, respectively.

Generally, layered photoresponsive imaging members are described in a number of U.S. patents, such as U.S. Pat. No. 4,265,990, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

In copending application U.S. Ser. No. 537,714 (D/90087), the disclosure of which is totally incorporated herein by reference, there are illustrated certain photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example, U.S. Pat. No. 4,429,029.

In U.S. Pat. No. 5,153,313 the disclosure of which is totally incorporated herein by reference, there is illustrated a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of the composite; and recovering the phthalocyanine composite precipitated product.

In U.S. Pat. No. 5,166,339 the disclosure of which is totally incorporated herein by reference, there is illustrated a process for the preparation of titanyl phthalocyanine which comprises the reaction of titanium tetrapropoxide with diiminoisoindolene in N-methylpyrrolidone solvent to provide Type I, or β-type titanyl phthalocyanine as determined by X-ray powder diffraction; thereafter dissolving the resulting titanyl phthalocyanine in a mixture of trifluoroacetic acid and methylene chloride; adding the resulting mixture to a stirred organic solvent, such as methanol, or to water; separating the resulting precipitate by, for example, vacuum filtration through a glass fiber paper in a Buchner funnel; and washing the titanyl phthalocyanine product. Examples of titanyl phthalocyanine reactants that can be selected in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides, such as titanium trichloride, titanium tetrachloride or tetrabromide, titanium tetraalkoxides such as titanium tetra-methoxide, -ethoxide, -propoxide, -butoxide, -isopropoxide and the like; and other titanium salts with compounds such as phthalonitrile and diiminoisoindolene in solvents such as 1-chloronaphthalene, quinoline, N-methylpyrrolidone, and alkylbenzenes such as xylene at temperatures of from about 120° to about 300° C.; specific polymorphs of titanyl phthalocyanine such as Type I, I, III, and IV, the preparation of which, for example, is described in the literature; or any other suitable polymorphic form of TiOPc; substituted titanyl phthalocyanine pigments having from 1 to 16 substituents attached to the outer ring of the compound, said substituent being, for example, halogens such as chloro-, bromo-, iodo- and fluoro- alkyls with from 1 to about 6 carbon atoms such as methyl-, ethyl-, propyl-, isopropyl-, butyl-, pentyl-, and hexyl-; nitro, amino, alkoxy and alkylthio, such as methoxy-, ethoxy- and propylthio- groups; and mixtures thereof.

As the solvent mixture, there can be selected a strong organic acid, such as a trihaloacetic acid, including trifluoroacetic acid or trichloroacetic acid, and a cosolvent, such as an alkylene halide, such as methylene chloride, chloroform, trichloroethylene, bromoform and other short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids and which will effectively dissolve the titanyl phthalocyanine in effective amounts of, for example, a ratio of from about 1 to 50 parts of acid to about 50 parts of cosolvent such as methylene chloride. In an embodiment, one solvent mixture is comprised of trifluoroacetic acid and methylene chloride in a ratio of from about 5 parts of acid to about 95 parts of methylene chloride to about 25 parts of acid to about 75 parts of methylene chloride. Subsequent to solubilization with the above solvent mixture and stirring for an effective period of time of, for example, from about 5 minutes to several days, the resulting mixture is added to a solvent that will enable precipitation of the desired titanyl phthalocyanine polymorph, such as Type IV, which solvent is comprised of an alcohol, such as an alkylalcohol including methanol, ethanol, propanol, isopropanol, butanol, n-butanol, pentanol and the like; ethers such as diethyl ether and tetrahydrofuran; hydrocarbons such as pentane, hexane and the like with, for example, from about 4 to about 10 carbon atoms; aromatic solvents such as benzene, toluene, xylene, halobenzenes such as chlorobenzene, and the like; carbonyl compounds such as ketones such as acetone, methyl ethyl ketone, and butyraldehyde; glycols such as ethylene and propylene glycol and glycerol; polar aprotic solvents such as dimethyl sulfoxide, dimethylformamide and N-methyl pyrrolidone; and water, as well as mixtures of the aforementioned solvents, followed by filtration of the titanyl phthalocyanine polymorph, and washing with various solvents such as, for example, deionized water and an alcohol, such as methanol and the like, which serves to remove residual acid and any impurities which might have been released by the process of dissolving and reprecipitating the pigment. The solid resulting can then be dried by, for example, heating yielding a dark blue pigment of the desired titanyl phthalocyanine polymorph, the form of which was determined by the composition of the precipitant solvent. The polymorphic form and purity of the product was determined by XRPD analysis.

In working Examples II and IV of the aforementioned U.S. Pat. No. 5,166,339 it being noted that the preparation of X titanyl phthalocyanine is described in Example III, there is disclosed the following. A 1 liter three-necked flask fitted with mechanical stirrer, condenser and thermometer maintained under an atmosphere of argon was charged with diiminoisoindolene (94.3 grams, 0.65 mole), titanium tetrabutoxide (55.3 grams, 0.1625 mole; Aldrich) and 650 milliliters of 1-chloronaphthalene. The mixture was stirred and warmed. At about 140° C. the mixture turned dark green and began to reflux. At this time, the condenser was removed and the vapor (this was identified as n-butanol by gas chromatography) was allowed to escape until the reflux temperature reached 230° C. The reaction was maintained at about this temperature for one and one half hours then was cooled to 15° C. Filtration using a 1 liter sintered glass funnel and washing with boiling DMF, then methanol, provided 69.7 grams (74 percent yield) of blue pigment which was identified as Type I TiOPc by XRPD. Elemental analysis of the product was: C, 67.38; H, 2.78; N, 19.10; Ash, 13.61. TiOPC requires: C, 66.67; H, 2.80; N, 19.44; Ash, 13.61. A 20 milliliter aliquot of a solution of 10 grams of Type I TiOPc prepared in N-methylpyrrolidone solvent in 100 milliliters of a mixture of trifluoroacetic acid in methylene chloride (1:4, v/v) was added over a 2 minute period to a rapidly-stirred solution of methanol (45 milliliters) and water (135 milliliters). The resultant coarse suspension was stirred at room temperature for 35 minutes then was allowed to settle. The supernatant liquid was decanted and the blue residue was redispersed in 100 milliliters of methanol by stirring for 15 minutes. The suspension was filtered using a 7 centimeter diameter glass fiber filter in a porcelain funnel. The solid was washed in the funnel with 2×10 milliliter portions of methanol, 4×20 milliliter portions of deionized water and 2×10×20 milliliter portions of water and 2×10 milliliter portions of methanol. The solid was dried at 75° C. to yield 1.85 gram of blue pigment identified as Type IV TiOPc by XRPD.

Disclosed in U.S. Pat. No. 5,189,156 is a process for the preparation of titanyl phthalocyanine Type I which comprises the reaction of titanium tetraalkoxide and diiminoisoindolene in the presence of a halonaphthalene solvent; and illustrated in U.S. Pat. No. 5,206,359 is a process for the preparation of titanyl phthalocyanine which comprises the treatment of titanyl phthalocyanine Type X with a halobenzene. The disclosures of each of these patents are totally incorporated herein by reference.

Illustrated U.S. Pat. No. 5,384,223 the disclosure of which is totally incorporated herein by reference, is a photoconductive imaging member comprised of a supporting substrate, a photogenerating layer comprised of photogenerating pigments dispersed in a polystyrene/polyvinyl pyridine $A_n$-$B_m$ block copolymer wherein n represents the number of segments of the A monomer comprising the A block, and m represents the number of segments of the B monomer comprising the B block, and a charge transport layer.

Disclosed in U.S. Pat. No. 5,164,493 is a process for the preparation of titanyl phthalocyanine Type I which comprises the addition in a solvent of titanium tetraalkoxide to a mixture of phthalonitrile and a diiminoisoindolene, followed by heating. The disclosure of this application is totally incorporated herein by reference.

The disclosures of all of the aforementioned publications, laid open applications, copending applications and patents are totally incorporated herein by reference.

SUMMARY OF THE INVENTION

It is an object of the present invention to provide processes for the preparation of hydroxygallium phthalocyanines with many of the advantages illustrated herein.

It is yet another object of the present invention to provide economically scalable processes for the preparation of hydroxygallium phthalocyanines.

Another object of the present invention relates to the preparation of hydroxygallium Type V, and photoconductive imaging members thereof.

Further, another object of the present invention relates to the preparation of photogenerating hydroxygallium phthalocyanines Also, in another object of the present invention there are provided processes for the preparation of titanyl phthalocyanines by the hydrolysis of a halo, especially chloro gallium phthalocyanine, followed by the conversion thereof of the Type I hydroxygallium phthalocyanine obtained to Type V hydroxygallium phthalocyanine; and wherein solvents like chloronaphthalene are avoided thereby enabling in embodiments Type V with desirable minimal halo, especially chlorine, content.

A further object of the present invention resides in the provision of processes for the preparation of hydroxygallium phthalocyanines, especially Type V, with small average diameter particle sizes, for example from about 0.01 to about 0.5 micron in diameter as determined by SEM (scanning electron microscopy) and TEM (transmission electron microscopy). Layered imaging members comprised of the aforementioned titanyl phthalocyanines possess excellent photosensitivity characteristics.

Another object of the present invention resides in a process for the preparation of Type V hydroxy gallium phthalocyanine with excellent xerographic photosensitivity when the Type V is selected as a photogenerator in a layered imaging member. The xerographic electrical properties of the imaging members can be determined by known means, including as indicated herein electrostatically charging the surfaces thereof with a corona discharge source until the surface potentials, as measured by a capacitively coupled probe attached to an electrometer, attained an initial value $V_0$ of about −800 volts. After resting for 0.5 second in the dark, the charged members in embodiments attained a surface potential of $V_{ddp}$, dark development potential, and each member was then exposed to light from a filtered Xenon lamp with a XBO 150 watt bulb. A reduction in surface potential to a $V_{bg}$ value, background potential, due to photodischarge effect was observed in embodiments. The dark decay in volts/second was calculated as $(V_o-V_{ddp})/0.5$. The percent of photodischarge was calculated as 100 percent $(V_{ddp}-V_{bg})/V_{ddp}$. The desired wavelength and energy of the exposed light was determined by the type of filters placed in front of the lamp. The broad band white light (400 to 700 nanometers) photosensitivity of these imaging members was measured by using an infrared cut-off filter whereas the monochromatic light photosensitivity was determined with a narrow band-pass filter. The photosensitivity of the imaging members is usually provided in terms of the amount of expose energy in ergs/cm$^2$, designated as $E_{1/2}$, required to achieve 50 percent photodischarge from the dark development potential. The higher the photosensitivity, the smaller is the $E_{1/2}$ value.

Moreover, another object of the present invention relates to the economical preparation of hydroxygallium phthalocyanine Type V with high purities of, for example, greater than about 99 percent, and the use thereof in electrophotographic processes; and which Type V contains minimal amounts of chlorine thereby enabling photoconductive imaging members with improved electrical characteristics.

Moreover, another object of the present invention relates to the preparation of certain hydroxygallium phthalocyanines with high purities, and in particular, having very low levels of residual chlorine, of from about 0.001 percent to about 0.1 percent, and in embodiments, about 0.03 percent of the weight of the Type V hydroxygallium phthalocyanine. It is believed that Impurities, such as chlorine, in the photogenerating Type V hydroxygallium phthalocyanine can cause a reduction in the xerographic performance thereof, and in particular, increased levels of dark decay and a negative adverse impact on the cycling performance of the photoreceptor device.

Additionally, another object of the present invention relates to the preparation of hydroxygallium phthalocyanine polymorphs, especially the Type V, in acceptable yields of, for example, exceeding about 50 percent, and a high purity of, for example, about 99 percent in embodiments.

Additionally, another object of the present invention relates to the preparation of hydroxygallium phthalocyanine polymorphs at a low cost, in embodiments, resulting in a cost savings of about $1,000 per kilogram of chlorogallium phthalocyanine Type I.

Another object of the present invention in an embodiment thereof resides in the preparation of hydroxygallium phthalocyanine polymorphs, especially Type V, with a small particle size of about 0.01 to about 0.1 micron in average diameter which is advantageous for the preparation of electrophotographic devices since, for example, the prepared polymorphs can be easily dispersed in coating compositions.

Yet another object of the present invention resides in processes wherein mild conversion conditions can be selected, which do not cause decomposition of the hydroxygallium phthalocyanine pigment product.

A further specific object of the present invention resides in the provision of photoresponsive imaging members with an aryl amine hole transport layer, and a photogenerator layer comprised of hydroxygallium phthalocyanine pigment components obtained by the processes illustrated herein.

Moreover, another object of the present invention resides in the effective preparation of halo, especially chlorogallium phthalocyanine, by the reaction of gallium chloride with 1,3-diiminoisoindolene ($DI^3$) in certain solvents like n-methylpyrrolidone, or the reaction of a mixture of phthalonitrile and gallium chloride with a chloronaphthalene solvent; and wherein Type V hydroxygallium phthalocyanine is obtained from the prepared chlorogallium phthalocyanine. Imaging members containing the Type V exhibited a substantial decrease in both dark decay and cycle down with minimal effect on photosensitivity.

These, and other objects of the present invention can be accomplished in embodiments thereof by the provision of processes for the preparation of hydroxygallium phthalocyanines and photoresponsive imaging members thereof. More specifically, in embodiments of the present invention there are provided processes for the preparation of hydroxygallium phthalocyanine polymorphs, which comprises the synthesis of a halo, especially chlorogallium phthalocyanine; hydrolysis thereof; and conversion of the hydroxygallium phthalocyanine obtained to Type V hydroxygallium phthalocyanine. In embodiments, preparation of the precursor pigment halo, especially chlorogallium phthalocyanine Type I, by the process of the present invention results in photogenerator pigments, specifically hydroxygallium phthalocyanine Type V with very low levels of chlorine of, in embodiments, less than 0.1 percent and, more specifically, preferably from about 0.05 to about 0.75 percent. It is believed that impurities, such as chlorine, especially in excess of the aforementioned amounts in the photogenerating Type V hydroxygallium phthalocyanine can cause a reduction in the xerographic performance thereof, and in particular, increased levels of dark decay and a negative adverse impact on the cycling performance of the photoreceptor device. The hydroxy and chlorogallium phthalocyanines can be identified by various known means including X-ray powder diffraction (XRPD).

In one embodiment the process of the present invention comprises the preparation of the precursor halo, especially chlorogallium phthalocyanine, by the reaction of halo, especially chlorogallium, with diiminoisoindolene ($DI^3$) and an organic solvent like N-methylpyrrolidone; followed by washing with, for example, a solvent like dimethylformamide (DMF). The precursor obtained was identified as chlorogallium phthalocyanine Type I on the basis of its XRPD trace. Thereafter, the precursor is subjected to hydrolysis by heating in the presence of a strong acid like sulfuric acid, and subsequently reprecipitating the dissolved pigment by mixing with a basic solution like ammonium hydroxide, and isolating the resulting pigment, which was identified as Type I hydroxygallium phthalocyanine on the basis of its XRPD trace. The obtained Type I was then converted to Type V chlorogallium by adding thereto a solvent component like N,N-dimethylformamide, and subsequently stirring or alternatively milling in a closed container on an appropriate instrument, for example a ball mill, at room temperature, approximately 25° C., for a period of from about 8 hours to 1 week, and preferably about 24 hours.

In embodiments, the pigment precursor Type I chlorogallium phthalocyanine can be prepared by reaction of gallium chloride in a solvent, such as N-methylpyrrolidone, present in an amount of from about 10 parts to about 100 parts, and preferably about 19 parts, with 1,3-diiminoisoindolene ($DI^3$), in an amount of from about 1 part to about 10 parts, and preferably about 4 parts of $DI^3$, for each part of gallium chloride that is reacted, and wherein in embodiments the reaction is accomplished by heating at, for example, about 200° C. When the resulting pigment precursor chlorogallium phthalocyanine Type I is hydrolyzed by, for example, acid pasting, whereby the pigment precursor is dissolved in concentrated sulfuric acid and then reprecipitated in a solvent, such as water, or a dilute ammonia solution, for example, from about 10 to about 15 percent, the hydrolyzed pigment contains very low levels of residual chlorine of from about 0.001 percent to about 0.1 percent, and in embodiments from about 0.03 percent of the weight of the Type I hydroxygallium pigment, as determined by elemental analysis.

Embodiments of the present invention are directed to processes for the preparation of hydroxygallium phthalocyanine Type V, which comprise the reaction of 1 part of gallium chloride with from about 1 part to about 10 parts and preferably about 4 parts of 1,3-diiminoisoindolene in a solvent, such as N-methyl pyrrolidone, in an amount of from about 10 parts to about 100 parts and preferably about 19 parts, for each part of gallium chloride that is used, to provide crude Type I chlorogallium phthalocyanine, which is subsequently washed with a component such as dimethylformamide to provide a pure form of Type I chlorogallium phthalocyanine as determined by X-ray powder diffraction; dissolving 1 weight part of the resulting chlorogallium phthalocyanine in concentrated, about 94 percent, sulfuric acid in an amount of from about 1 weight part to about 100 weight parts, and in an embodiment about 5 weight parts, by stirring said pigment in said acid for an effective period of time, from about 30 seconds to about 24 hours, and in an embodiment about 2 hours at a temperature of from about 0° C. to about 75° C., and preferably about 40° C., in air or under an inert atmosphere such as argon or nitrogen; adding the resulting mixture to a stirred organic solvent in a dropwise manner at a rate of about 0.5 milliliter per minute to about 10 milliliters per minute and in an embodiment about 1 milliliter per minute to a nonsolvent, which can be a mixture comprised of from about 1 volume part to about 10 volume parts and preferably about 4 volume parts of concentrated aqueous ammonia solution (14.8N) and from about 1 volume part to about 10 volume parts, and preferably about 7 volume parts of water, for each volume part of sulfuric acid that was used, which solvent mixture was chilled to a temperature of from about −25° C. to about 10° C. and in an embodiment about −5° C. while being stirred at a rate sufficient to create a vortex extending to the bottom of the flask containing the solvent mixture; isolating the resulting blue pigment by, for example, filtration; and washing the hydroxygallium phthalocyanine product obtained with deionized water by redispersing and filtering from portions of deionized water, which portions are from about 10 volume parts to about 400 volume parts and in an embodiment about 200 volume parts for each weight part of precursor pigment chlorogallium phthalocyanine Type I. The product, a dark blue solid, was confirmed to be Type I hydroxygallium phthalocyanine on the basis of its X-ray diffraction pattern, having major peaks at 6.9, 13.1, 16.4, 21.0, 26.4, and the highest peak at 6.9 degrees 2Θ. The Type I hydroxygallium phthalocyanine product obtained can then be treated with an organic solvent, such as N,N-dimethylformamide, by, for example, ball milling the Type I hydroxygallium phthalocyanine pigment in the presence of spherical glass beads, approximately 1 millimeters to 5 millimeters in diameter, at room temperature, about 25°, for a period of from about 12 hours to about 1 week, and preferably about 24 hours to obtain a hydroxygallium phthalocyanine Type V, in a purity of up to about 99.5 percent, and with minimal chlorine content.

For the preparation of the precursor Type I chlorogallium phthalocyanine, the process in embodiments comprises the reaction by heating of 1 part gallium chloride with from about 1 part to about 10 parts and preferably about 4 parts of $DI^3$ (1,3-diiminoisoindolene) in the presence of N-methyl pyrrolidone solvent in an amount of from about 10 parts to about 100 parts and preferably about 19 parts, whereby there is obtained a crude chlorogallium phthalocyanine Type I, which is subsequently purified, up to about a 99.5 percent purity, by washing with, for example, hot dimethylformamide, at a temperature of from about 70° C. to about 150° C., and preferably about 150° C., in an amount of from about 1 to about 10, and preferably about 3 times the volume of the solid being washed.

In embodiments, the process of the present invention comprises 1) the addition of 1 part of gallium chloride to a stirred solvent N-methyl pyrrolidone present in an amount of from about 10 parts to about 100 parts, and preferably about 19 parts with from about 1 part to about 10 parts and preferably about 4 parts of 1,3-diiminoisoindolene; 2) relatively slow application of heat using an appropriate sized heating mantle at a rate of about 1° per minute to about 10° per minute and preferably about 5° per minute until refluxing occurs at a temperature of about 200° C.; 3) continued stirring at the reflux temperature for a period of about 0.5 hour to about 8 hours and preferably about 4 hours; 4) cooling of the reactants to a temperature of about 130° C. to about 180° C. and preferably about 160° C., by removal of the heat source; 5) filtration of the flask contents through, for example, an M-porosity (10 to 15 µm) sintered glass funnel which was preheated using a solvent which is capable of raising the temperature of the funnel to about 150° C., for example, boiling N,N-dimethylformamide in an amount sufficient to completely cover the resulting purple solid by slurrying the solid in portions of boiling DMF either in the funnel or in a separate vessel in a ratio of about 1 to about 10, and preferably about 3 times the volume of the solid being washed until the hot filtrate became light blue in color; 7) cooling and further washing the solid of impurities by slurrying said solid in several portions of N,N-dimethylformamide at room temperature, about 25° C., approximately equivalent to about three times the volume of the solid being washed, until the filtrate became light blue in color; 8) washing the solid of impurities by slurrying in portions of an organic solvent, such as methanol, acetone, water and the like, and in an embodiment methanol, at room temperature, about 25° C., approximately equivalent to about three times the volume of the solid being washed, until the filtrate became light blue in color; 9) oven drying the solid in the presence of a vacuum or in air at a temperature of from about 25° C. to about 200° and preferably about 70° C. for a period of from about 2 hours to about 48 hours and preferably about 24 hours thereby resulting in the isolation of a shiny purple solid which was identified as being Type I chlorogallium phthalocyanine by its X-ray powder diffraction trace, having major peaks at 9.1, 11.0, 18.8, 20.3, and the highest peak at 27.0 degrees 2Θ.

Also, in embodiments there can be selected for the processes illustrated herein and wherein, for example, hydroxygallium Type V essentially free of chlorine can be obtained by selecting a mixture of $DI^3$ and phthalonitrile, in place of $DI^3$ alone. More specifically, the pigment precursor chlorogallium phthalocyanine Type I can be prepared by reaction of 1 part gallium chloride with a mixture comprised of from about 0.1 part to about 10 parts and preferably about 1 part of $DI^3$ (1,3diiminoisoindolene) and from about 0.1 part to about 10 parts, and preferably about 3 parts of o-phthalonitrile in the presence of N-methyl pyrrolidone solvent, in an amount from about 10 parts to about 100 parts and preferably about 19 parts. The resulting pigment was identified as being Type I chlorogallium phthalocyanine by its X-ray powder diffraction trace having major peaks at 9.1, 11.0, 18.8, 20.3, and the highest peak at 27.0 degrees 2Θ. When this pigment precursor is hydrolyzed by, for example, acid pasting, whereby the pigment precursor is dissolved in concentrated sulfuric acid and then reprecipitated in a solvent, such as water, or a dilute ammonia solution, for example, from about 10 to about 15 percent, the hydrolyzed Type V pigment contains very low levels of residual chlorine. It is believed that impurities, such as chlorine, in the photogenerating material can cause a reduction in the xerographic performance, and in particular, increased levels of dark decay and a negative impact on the cycling performance of layered photoconductive imaging members thereof.

One embodiment of the present invention is directed to processes for the preparation of hydroxygallium phthalocyanine Type V, which comprise the reaction of 1 part of gallium chloride with a mixture comprised of from about 0.1 part to about 10 parts and preferably about 1 part of 1,3-diimiinoisoindolene and from about 0.1 parts to about 10 parts and preferably about 3 parts of o-phthalonitrile in a solvent, such as N-methyl pyrrolidone, present in an amount of from about 10 parts to about 100 parts and preferably about 19 parts, for each part of gallium chloride that is used, to provide crude Type I chlorogallium phthalocyanine, which is subsequently washed with a component, such as hot dimethylformamide, by slurrying this crude solid in portions of DMF at a temperature of from about 75° C. to about 150° C. and preferably about 150° C., either in a funnel or in a separate vessel in a ratio of about 1 to about 10, and preferably about 3 times the volume of the solid being washed, until the hot filtrate became light blue in color, to provide a pure form of chlorogallium phthalocyanine Type I as determined by X-ray powder diffraction; dissolving the resulting chlorogallium phthalocyanine Type I in concentrated sulfuric acid in an amount of from about 1 weight part to about 100 weight parts, and in an embodiment about 5 weight parts of concentrated, about 94 percent, sulfuric acid, by stirring the Type I pigment in the acid for an effective period of time, from about 30 seconds to about 24 hours, and in an embodiment about 2 hours at a temperature of from about 0° C. to about 75° C., and preferably about 40° C. in air or under an inert atmosphere such as argon or nitrogen; adding the dissolved precursor pigment chlorogallium phthalocyanine Type I in a dropwise manner at a rate of about 0.5 milliliter per minute to about 10 milliliters per minute and in an embodiment about 1 milliliter per minute to a solvent mixture which enables reprecipitation of the dissolved pigment, which solvent can be a mixture comprised of from about 1 volume part to about 10 volume parts and preferably about 4 volume parts of concentrated aqueous ammonia solution (14.8 N) and from about 1 volume part to about 10 volume parts, and preferably about 7 volume parts of water for each volume part of sulfuric acid that was used, which solvent mixture was chilled to a temperature of from about −25° C. to about 10° C. and in an embodiment about −5° C. while being stirred at a rate sufficient to create a vortex extending to the bottom of the flask containing said solvent mixture; filtering the dark blue suspension through a glass fiber filter fitted in a porcelain funnel; washing the isolated solid by redispersing in water by stirring for a period of from about 1 minute to about 24 hours and in an embodiment about 1 hour in an amount of from about 10 volume parts to about 400 volume parts, and in an embodiment about 200 volume parts relative to the original weight of solid Type I pigment used, followed by filtration as illustrated herein, until the conductivity of the filtrate was measured as less than 20 µS; and drying the resulting blue pigment in air or in the presence of a vacuum at a temperature of from about 25° C. to about 200° C., and in an embodiment in air at about 70° C. for a period of from about 5 minutes to about 48 hours, and in an embodiment about 12 hours to afford a dark blue powder in a desirable yield of from about 75 percent to about 99 percent, and in an embodiment about 97 percent which has been identified as being Type I hydroxygallium phthalocyanine on the basis of its XRPD spectrum, having major peaks at 6.9, 13.1, 16.4, 21.0, 26.4, and the highest peak at 6.9 degrees 2Θ. The Type I hydroxygallium phthalocyanine product so obtained can then be treated with a solvent, such as N,N-dimethylformamide, present in an amount of from about 1 volume part to about 50 volume parts, and preferably about 15 volume parts for each weight part of pigment hydroxygallium phthalocyanine that is used by, for example, ball milling the Type I hydroxygallium phthalocyanine pigment in the presence of spherical glass beads, approximately 1 millimeters to 5 millimeters in diameter, at room temperature, about 25° C., for a period of from about 12 hours to about 1 week, and preferably about 24 hours, such that there is obtained a hydroxygallium phthalocyanine Type V, in a purity of from about 95 to about 99.5 percent, and with minimal chlorine.

For the preparation of the precursor Type I chlorogallium phthalocyanine, the process in an embodiment comprises the reaction of 1 part of gallium chloride with a mixture comprised of from about 0.1 part to about 10 parts, and preferably about 1 part of $DI^3$ (1,3-diiminoisoindolene) and from about 0.1 part to about 10 parts, and preferably about 3 parts of o-phthalonitrile in the presence of N-methyl pyrrolidone solvent in an amount from about 10 parts to about 100 parts, and preferably about 19 parts, whereby there is obtained a crude chlorogallium phthalocyanine Type I, which is subsequently purified, up to about a 99.5 percent purity, by washing with, for example, hot dimethylformamide in an amount of from about 1 to about 10, and preferably about 3 times the volume of the solid being washed.

In another embodiment, the process of the present invention comprises 1) the addition of 1 part of gallium chloride to the stirred solvent N-methyl pyrrolidone present in an amount of from about 10 parts to about 100 parts, and preferably about 19 parts with from about 0.1 part to about 4 parts, and preferably about 1 part of 1,3-diiminoisoindolene, and from about 0.1 part to about 4 parts, and preferably about 3 parts of o-phthalonitrile, such that the combination of the latter two reagents totals about 4 parts for each part of gallium chloride that is used; 2) relatively slow, but steady application of heat using an appropriate sized heating mantle at a rate of about 1° per minute to about 10° per minute and preferably about 5° per minute until refluxing occurs at a temperature of about 200° C.; 3) continued stirring at said reflux temperature for a period of about ½ hour to about 8 hours, and preferably about 4 hours; 4) cooling of the reactants to a temperature of about 130° C. to about 180° C., and preferably about 160° C. by removal of the heat source; 5) filtration of the flask contents through, for example, an M-porosity (10 to 15 µm) sintered glass funnel which was preheated using a solvent which is capable of raising the temperature of the funnel to about 150 degrees, for example, boiling N,N-dimethylformamide in an amount sufficient to completely cover the bottom of the filter funnel so as to prevent blockage of the funnel; 6) washing the resulting purple solid by slurrying said solid in portions of boiling DMF either in the funnel or in a separate vessel in a ratio of about 1 to about 10, and preferably about 3 times the volume of the solid being washed until the hot filtrate became light blue in color; 7) cooling and further washing the solid of impurities by slurrying the solid in several portions of N,N-dimethylformamide at room temperature, about 25° C., approximately equivalent to about three times the volume of the solid being washed until the filtrate became light blue in color; 8) washing the solid of impurities by slurrying in several portions of an organic solvent, such as methanol, acetone, water, mixtures thereof and the like, and in an embodiment methanol at room temperature, about 25° C., approximately equivalent to about three times the volume of the solid being washed until the filtrate became light blue in color; and 9) oven drying the solid in the presence of a vacuum or in air at a temperature of from about 25° C. to about 200° C., and preferably about 70° C. for a period of from about 2 hours to about 48 hours, and preferably about 24 hours thereby resulting in the isolation of a shiny purple solid which was identified as being Type I chlorogallium phthalocyanine by its X-ray powder diffraction trace with major peaks at 9.1, 11.0, 18.8, 20.3, and the highest peak at 27.0 degrees 2Θ. This particular embodiment can result in a cost savings of $1,000 per kilogram of chlorogallium phthalocyanine Type I that is realized.

The Type I chlorogallium phthalocyanine obtained can then be converted to Type I hydroxygallium phthalocyanine by the dissolution thereof in concentrated sulfuric acid, and thereafter reprecipitating the product obtained in a solvent mixture of, for example, aqueous ammonia solution. In a specific embodiment of the present invention, the Type I chlorogallium phthalocyanine obtained can be converted to Type I hydroxygallium phthalocyanine by 1) dissolving 1 weight part of the Type I chlorogallium phthalocyanine pigment in a ratio of from about 1 weight part to about 100 weight parts, and in an embodiment about 5 weight parts of concentrated, about 94 percent, sulfuric acid by stirring the pigment in the acid for an effective period of time, from about 30 seconds to about 24 hours, and in an embodiment about 2 hours at a temperature of from about 0° C. to about 75° C., and preferably about 40° C. in air or under an inert atmosphere such as argon or nitrogen; 2) reprecipitating the dissolved Type I chlorogallium phthalocyanine pigment by adding the dissolved solution in a dropwise manner at a rate of about 0.5 milliliter per minute to about 10 milliliters per minute, and in an embodiment about 1 milliliter per minute to a nonsolvent, which can be a mixture comprised of from about 1 volume part to about 10 volume parts, and preferably about 4 volume parts of a concentrated aqueous ammonia solution (14.8 N) and from about 1 volume part to about 10 volume parts, and preferably about 7 volume parts of water, for each volume part of sulfuric acid that was used, which solvent mixture was chilled to a temperature of from about −25° C. to about 10° C., and in an embodiment about −5° C. while being stirred at a rate sufficient to create a vortex extending to the bottom of the flask containing said solvent mixture; 3) filtering the dark blue suspension through a glass fiber filter fitted in a porcelain funnel; 4) washing the isolated solid by redispersing in water by stirring for a period of from about 1 minute to about 24 hours, and in an embodiment about 1 hour in an amount of from about 10 volume parts to about 400 volume parts, and in an embodiment about 200 volume parts relative to the original weight of the solid Type I pigment used, followed by filtration as illustrated herein; 5) repeating steps 3 and 4 until the conductivity of the filtrate was measured as less than about 20 µS, and more specifically about 18 µS; and 6) drying the resulting blue pigment in air or in the presence of a vacuum at a temperature of from about 25° C. to about 200° C., and in an embodiment in air at about 70° C. for a period of from about 5 minutes to about 48 hours, and in an embodiment about 12 hours to afford a dark blue powder in a desirable yield of from about 75 percent to about 99 percent, and in an embodiment about 97 percent which has been identified as being Type I hydroxygallium phthalocyanine on the basis of its XRPD spectrum, having major peaks at 6.9, 13.1, 16.4, 21.0, 26.4, and the highest peak at 6.9 degrees 2Θ. The aforementioned Type I hydroxygallium phthalocyanine, which particles were found to be very small, from about 0.01 µm to about 0.1µm, and in an embodiment about 0.03 µm, can be selected as a photogenerator for use in a layered photoconductive device or imaging member, or can be utilized as an intermediate for the conversion thereof to Type V hydroxygallium phthalocyanine by the treatment thereof with a solvent, such as N,N-dimethylformamide by, for example, ball milling the Type I hydroxygallium phthalocyanine pigment in the presence of spherical glass beads, approximately 1 millimeter to 5 millimeters in diameter, at room temperature, about 25° C., for a period of from about 12 hours to about 1 week, and preferably about 24 hours.

The Type I hydroxygallium phthalocyanine obtained can be treated by, for example, ball milling the Type I hydroxygallium phthalocyanine pigment in a suitable solvent, for example N,N-dimethylformamide, present in an amount of from about 5 volume parts to about 50 volume parts, and preferably about 15 volume parts for each weight part of pigment, hydroxygallium phthalocyanine Type I, that is used in the presence of spherical glass beads, approximately 1 millimeter to 5 millimeters in diameter, at room temperature, about 25° C., for a period of from about 12 hours to about 1 week, and preferably about 24 hours to provide Type V hydroxygallium phthalocyanine having exceptionally low levels of chlorine, of from about 0.001 percent to about 0.1 percent, and in an embodiment about 0.01 percent of the weight of the Type V hydroxygallium pigment, as determined by elemental analysis, and very small particle size of from about 0.01 µm to about 0.1 µm, and in an embodiment about 0.03 µm in diameter, when the precursor pigment chlorogallium phthalocyanine Type I was prepared using 1 part of gallium chloride and from about 1 part to about 10 parts, and preferably about 4 parts of DI$^3$ in about 19 parts of N-methylpyrrolidone as reagents, and in an embodiment 0.01 percent chlorine, as measured by elemental analysis, and very small particle size, from about 0.01 µm to about 0.1 µm, and in an embodiment about 0.03 µm, when the precursor pigment chlorogallium phthalocyanine Type I was prepared using 1 part of gallium chloride with a mixture comprised of from about 0.1 part to about 10 parts, and preferably about 1 parts of DI$^3$ and from about 0.1 part to about 10 parts, and preferably about 3 parts of phthalonitrile, such that the latter two reagents total 4 parts, for each part of gallium chloride used, and about 19 parts of N-methylpyrrolidone as reagents.

Other synthetic methods, for example the reaction of 1 part of gallium chloride with from about 1 part to about 10 parts, and preferably about 4 parts of phthalonitrile in about 19 parts of N-methylpyrrolidone or chloronaphthalene can be selected to prepare the precursor chlorogallium phthalocyanine Type I, however, higher levels of chlorine may be retained in the final product Type V hydroxygallium phthalocyanine, for example from about 0.3 percent to about 0.8 percent, and in an embodiment, 0.5 percent of chlorine, as measured by elemental analysis. It is believed that impurities, such as chlorine, at certain amounts like 0.5 percent in the photogenerating material or pigment can cause a reduction in the xerographic performance of the pigment, and in particular, increased levels of dark decay and a negative impact on the cycling performance of the resulting layered photoconductive imaging members.

The Type I hydroxygallium phthalocyanine obtained can be treated by, for example, ball milling in a suitable solvent, for example N,N-dimethylformamide, present in an amount of from about 5 volume parts to about 50 volume parts, and preferably about 15 volume parts for each weight part of pigment, hydroxygallium phthalocyanine Type I, that is used in the presence of spherical glass beads, approximately 1 millimeter to 5 millimeters in diameter at room temperature, about 25°, for a period of from about 12 hours to about 1 week, and preferably about 24 hours, to provide Type V hydroxygallium phthalocyanine having excellent xerographic characteristics when selected as a photogenerator in a layered photoconductive imaging member with a supporting substrate and a charge transport layer. In an embodiment, the xerographic characteristics of the aforementioned imaging member with a hydroxygallium phthalocyanine Type V photogenerator, when the precursor pigment chlorogallium phthalocyanine Type I was prepared using DI$^3$ and gallium chloride in N-methylpyrrolidone as reagents, and with an aryldiamine charge transport as the top layer, and an aluminum substrate in contact with the photogenerating layer were $E_{1/2}$= 1.5 to 1.7 ergs/cm$^2$, dark decay =5 to 10 volts/second, and a photosensitivity of 270 to 300 V.cm$^2$/ergs. Excellent xerographic cycling characteristics were also measured, for example, in an embodiment, $\Delta V_{ddp}$=−50 volts after 10,000 standard cycles were repeated, or $\Delta V_{ddp}$=−70 volts after 5,000 cycles under stress. In the standard cycling test, photoconductive devices were charged with a corotron to about −800 volts. They were then exposed with 775 nanometers light with an intensity of about 7 ergs/cm$^2$ and erased with white light of about 60 ergs/cm². The dark development ($V_{ddp}$) and background ($V_{bg}$) potentials were measured and recorded while the testing was performed for 10,000 cycles. After the standard cycling test had been completed, the devices or photoconductive imaging members were retained in the darkened drum scanner for about 20 hours. After charging the devices to about −800 volts with a corotron, they were exposed with 775 nanometers light with an intensity of 3 ergs/cm² and erased with white light of about 200 ergs/cm². The dark development and background potentials were measured and recorded while the testing was performed for 5,000 cycles. The significantly higher erase light intensity used in this second test compared to the standard test accelerates the cycle down (decrease in the dark development potential) in the photogenerator material and is thus considered a stress test. When utilizing the synthetic route of the present invention to achieve the intermediate chlorogallium phthalocyanine Type I, a number of advantages are provided, such as for example excellent cycling characteristics of the resulting imaging member, in embodiments of, for example, $\Delta V_{ddp}$=−43 volts after 10,000 cycles were repeated, or $\Delta V_{ddp}$=53 volts after 5,000 cycles under stress, as compared to, for example, when the precursor pigment is prepared using other reagents, for example, phthalonitrile and gallium chloride in N-methyl pyrrolidone or chloronaphthalene, whereby the cycling characteristics were measured as $\Delta V_{ddp}$=−72 volts after 10,000 cycles were repeated, or $\Delta V_{ddp}$=−127 volts after 5,000 cycles under stress were repeated. Furthermore, the use of the synthetic route of the present invention for the precursor pigment chlorogallium phthalocyanine affords product pigments of hydroxygallium phthalocyanine Type V having very low residual chlorine levels, in embodiments, 0.03 percent, as compared to, for example, when the precursor pigment is prepared using other reagents, for example phthalonitrile and gallium chloride in N-methyl pyrrolidone or chloronaphthalene, whereby the residual chlorine content was measured as about 0.5 percent.

The Type I hydroxygallium phthalocyanine obtained can be treated by, for example, ball milling the Type I hydroxygallium phthalocyanine pigment in a suitable solvent, for example N,N-dimethylformamide, present in an amount from about of in the presence of spherical glass beads, 1 millimeter to about 7 millimeters in diameter, at room temperature, about 25° C. or slightly above, for a period of from about 12 hours to about 1 week, and preferably about 24 hours, with a solvent, such as N,N-dimethylformamide, to provide Type V hydroxygallium phthalocyanine having excellent xerographic characteristics when selected as a photogenerator in a layered photoconductive imaging member with a supporting substrate and a charge transport layer. In an embodiment, the xerographic characteristics of the aforementioned imaging member with a hydroxygallium phthalocyanine Type V photogenerator when the precursor pigment chlorogallium phthalocyanine Type I was prepared using a 60/40 mixture of DI³ phthalonitrile and gallium chloride in N-methylpyrrolidone as reagents, and having an aryldiamine charge transport as the top layer, and an aluminum substrate in contact with the photogenerating layer were $E_{1/2}$=1.5 to 1.7 ergs/cm², dark decay= 5 to 10 volts/second, and a photosensitivity of 270 to 300 V.cm²/ergs. Excellent xerographic cycling characteristics were measured, for example, in an embodiment, $\Delta V_{ddp}$=43 volts after 10,000 cycles were repeated, or $\Delta V_{ddp}$=−53 volts after 5,000 cycles under stress were repeated. When utilizing the disclosed synthetic route to achieve the intermediate chlorogallium phthalocyanine Type I, a number of advantages are provided, such as for example excellent cycling characteristics of the resulting imaging member as compared to, for example, when the precursor pigment is prepared using other reagents, for example phthalonitrile and gallium chloride in N-methyl pyrrolidone or chloronaphthalene, whereby the cycling characteristics were measured as $\Delta V_{ddp}$=−72 volts after 10,000 cycles were repeated, or $\Delta V_{ddp}$=−127 volts, after 5,000 cycles under stress were repeated. Furthermore, the use of the disclosed synthetic route to the precursor pigment chlorogallium phthalocyanine affords product pigments hydroxygallium phthalocyanine Type V having very low residual chlorine levels in an embodiment, 0.01 percent, as compared to, for example, when the precursor pigment is prepared with, for example, phthalonitrile and gallium chloride in N-methyl pyrrolidone or chloronaphthalene, whereby the residual chlorine content was measured as being about 0.5 percent to about 0.6 percent.

Although the processes as illustrated may have been described selected, such as bromine, fluorine, and iodine in embodiments with reference to chlorine, it is believed that other halogens may be

BRIEF DESCRIPTION OF THE DRAWINGS

For a better understanding of the present invention and further features thereof, reference is made to the following detailed description of various preferred embodiments wherein.

Figure 1:
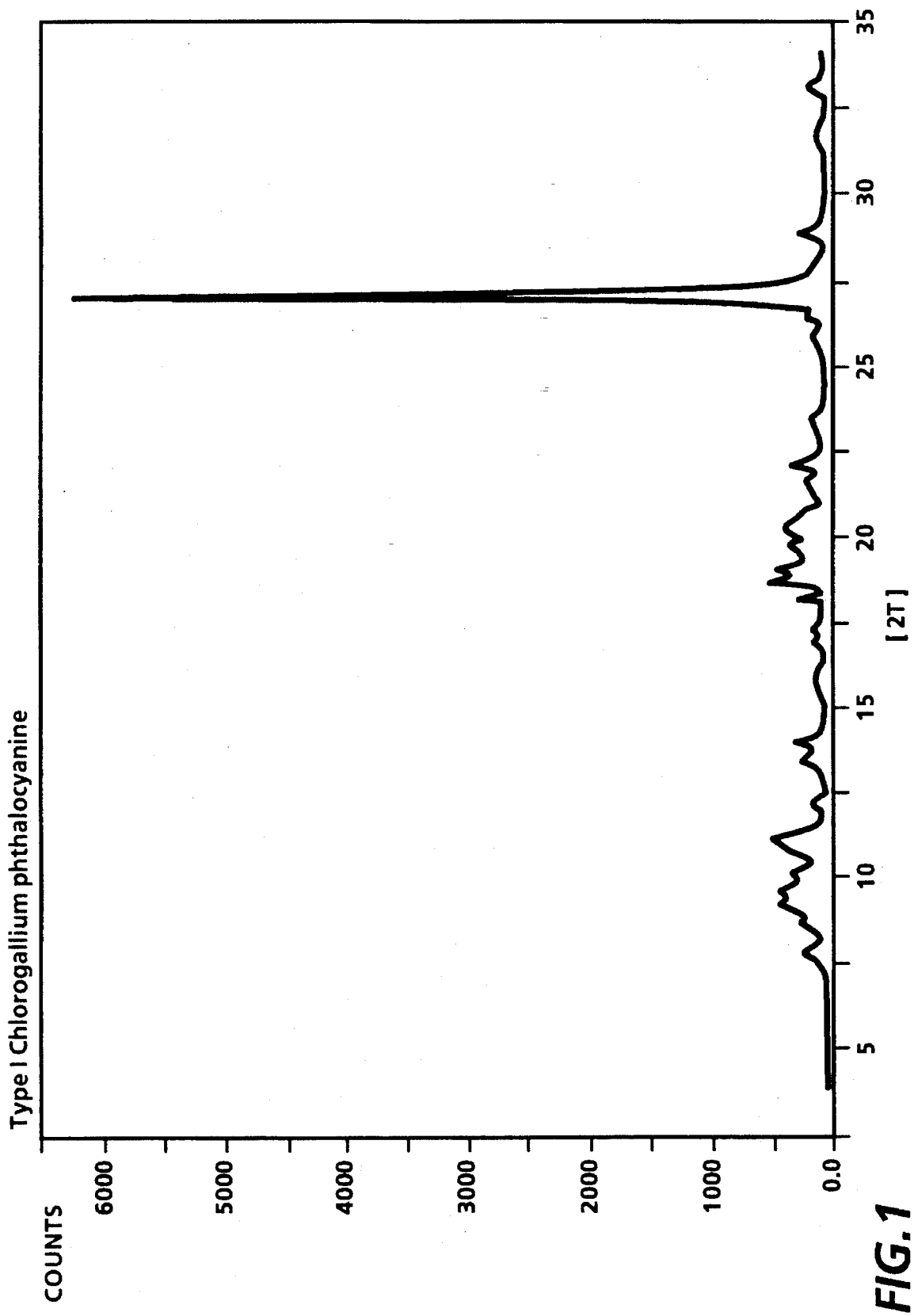
FIG. 1 illustrates the diffractograph summary of the XRPDs of Type I chlorogallium phthalocyanine having major peaks at 9.1, 11.0, 18.8, 20.3, and the highest peak at 27.0 degrees 2Θ prepared as described in Example I.

The angle of deviation of the diffracted X-rays, relative to the incident X-rays, is referred to as degrees 2Θ, and is indicated on the X axis of the X-ray diffraction patterns. The number of counts, indicated on the Y axis, is a measure of the number of X-ray photons reaching the detector.

DESCRIPTION OF SPECIFIC EMBODIMENTS

A negatively charged photoresponsive imaging member of the present invention is comprised of a supporting substrate, a solution coated adhesive layer thereover comprised, for example, of a polyester 49,000 available from Goodyear Chemical, a photogenerator layer in contact with the adhesive layer and coated thereover and comprised of hydroxygallium phthalocyanine, Type V, obtained with the process of the present invention, optionally dispersed in an inactive resinous binder, and a hole transport top layer comprised of N,N'-diphenyl-N,N'-bis(3-methyl phenyl)- 1,1'-biphenyl-4, 4'-diamine, dispersed in a polycarbonate resinous binder.

A positively charged photoresponsive imaging member of the present invention is comprised in the order stated of a substrate like aluminum, a charge transport layer coated thereover comprised of N,N'-diphenyl-N,N'-bis( 3-methyl phenyl)-1,1'-biphenyl-4,4'-diamine dispersed in a polycarbonate resinous binder, and a hydroxygallium phthalocyanine Type V photogenerator top layer; and wherein the Type V is obtained with the process of the present invention, and is optionally dispersed in an inactive resinous binder.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR® a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, substantially inflexible, seamless, with seams, rigid, and the like; and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON®.

The thickness of the substrate layer depends on many factors, including economical considerations, thus this layer may be of substantial thickness, for example over 3,000 microns, or of minimum thickness providing there are no adverse effects on the system. In embodiments, the thickness of this layer is from about 75 microns to about 300 microns.

With further regard to the imaging members, the photogenerator layer is preferably comprised of the hydroxygallium phthalocyanine pigments, especially Type V, obtained with the processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the hydroxygallium phthalocyanine photogenerator composition is present in an amount of from about 5 percent to about 100 percent by volume. In one embodiment, this layer is of a thickness of from about 0.1 micron to about 0.2 micron when the photogenerator composition is present in this layer in an amount of 30 to 75 percent by volume. The maximum thickness of this layer in embodiments is dependent primarily upon factors, such as photosensitivity, electrical properties and mechanical considerations. The charge generator layer can be obtained by dispersion coating the hydroxy gallium phthalocyanine, especially Type V (OHGaPc) obtained with the processes of the present invention, and a binder resin with a suitable solvent. The binder may also be omitted. The dispersion can be prepared by mixing and/or milling the OHGaPc in equipment such as paint shakers, ball mills, sand mills and attritors. Common grinding media such as glass beads, steel balls or ceramic beads may be used in this equipment. The binder resin may be selected from a number of known polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like, reference U.S. Pat. No. 3,121,006, the disclosure of which is totally incorporated herein by reference. Examples of solvents in effective amounts, such as from about 25 to about 200 milliliters, useful for coating OHGaPc dispersions to form a photogenerator layer include ketones, alcohols, aromatic hydrocarbons, halogenated aliphatic hydrocarbons, ethers, amines, amides, esters, and the like. Specific examples of solvents include cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate and methoxyethyl acetate, and the like.

The coating of the hydroxygallium Type V dispersion in embodiments of the present invention can be accomplished with spray, dip or wire-bar methods such that the final dry thickness of the charge generator layer is from about 0.01 to about 30 microns and preferably from about 0.1 to about 15 microns after being dried at 40° C. to 150° C. for about 5 to 90 minutes.

As adhesives usually in contact with the supporting substrate, there can be comprised of various known substances inclusive of polyesters, polyamides, poly(vinyl butyral), poly(vinyl alcohol), polyurethane and polyacrylonitrile. This layer is of a thickness of from about 0.05 micron to 1 micron. Optionally, this layer may contain conductive and nonconductive particles such as zinc oxide, titanium dioxide, silicon nitride, carbon black, and the like to provide, for example, in embodiments of the present invention further desirable electrical and optical properties.

Aryl amines selected for the hole transporting layer, which generally is of a thickness of from about 5 microns to about 75 microns, and preferably of a thickness of from about 10 microns to about 40 microns, include molecules of the following formula

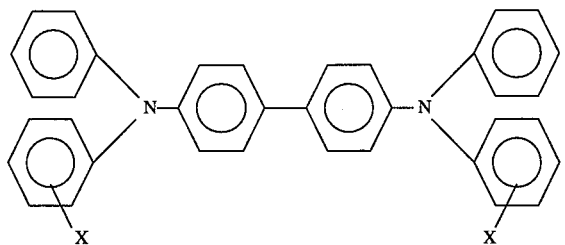

dispersed in a highly insulating and transparent organic resinous binder wherein X is an alkyl group or a halogen, especially those substituents selected from the group consisting of (ortho) $CH_3$, (para) $CH_3$, (ortho) Cl, (meta) Cl, and (para) Cl.

Examples of specific aryl amines are N,N'-diphenyl-N, N'-bis(alkylphenyl)- 1,1-biphenyl-4,4'-diamine wherein alkyl is selected from the group consisting of methyl, such as 2-methyl, 3-methyl and 4-methyl, ethyl, propyl, butyl, hexyl, and the like. With chloro substitution, the amine is N,N'-diphenyl-N,N'-bis(halo phenyl)-1,1'-biphenyl-4,4'-diamine wherein halo is 2-chloro, 3-chloro or 4-chloro. Other known charge transport layer molecules can be selected, reference for example U.S. Pat. Nos. 4,921,773 and 4,464,450, the disclosures of which are totally incorporated herein by reference.

Examples of the highly insulating and transparent resinous material or inactive binder resinous material for the transport layers include materials such as those described in U.S. Pat. No. 3, 121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active charge transport material, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE I

Figure 2:
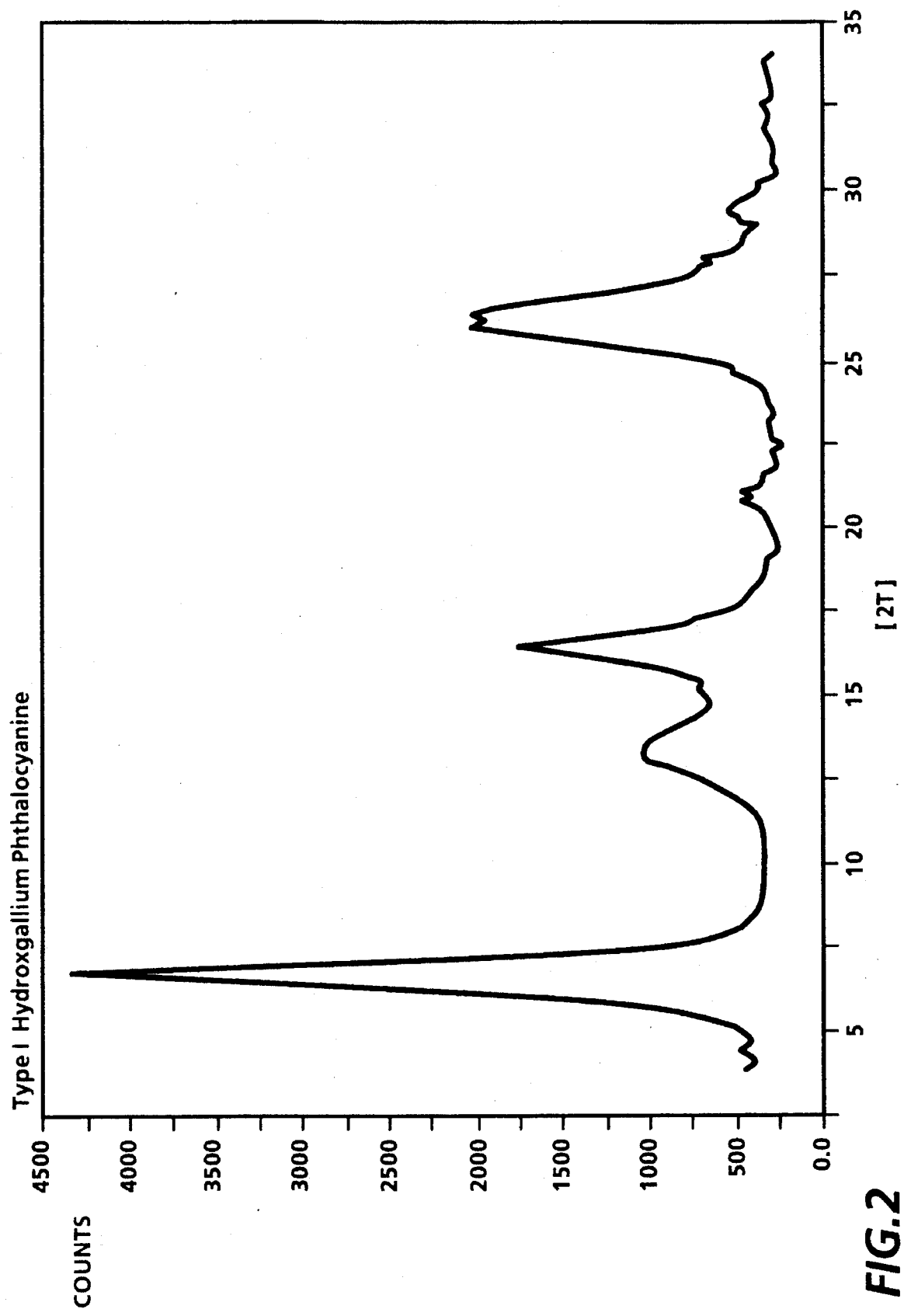
FIG. 2 represents the XRPD of Type I hydroxygallium phthalocyanine having major peaks at 6.9, 13.1, 16.4, 21.0, 26.4, and the highest peak at 6.9 degrees 2Θ prepared as described in Example VI, for which the pigment precursor, chlorogallium phthalocyanine Type I, was prepared as described in Example I.
Figure 3:
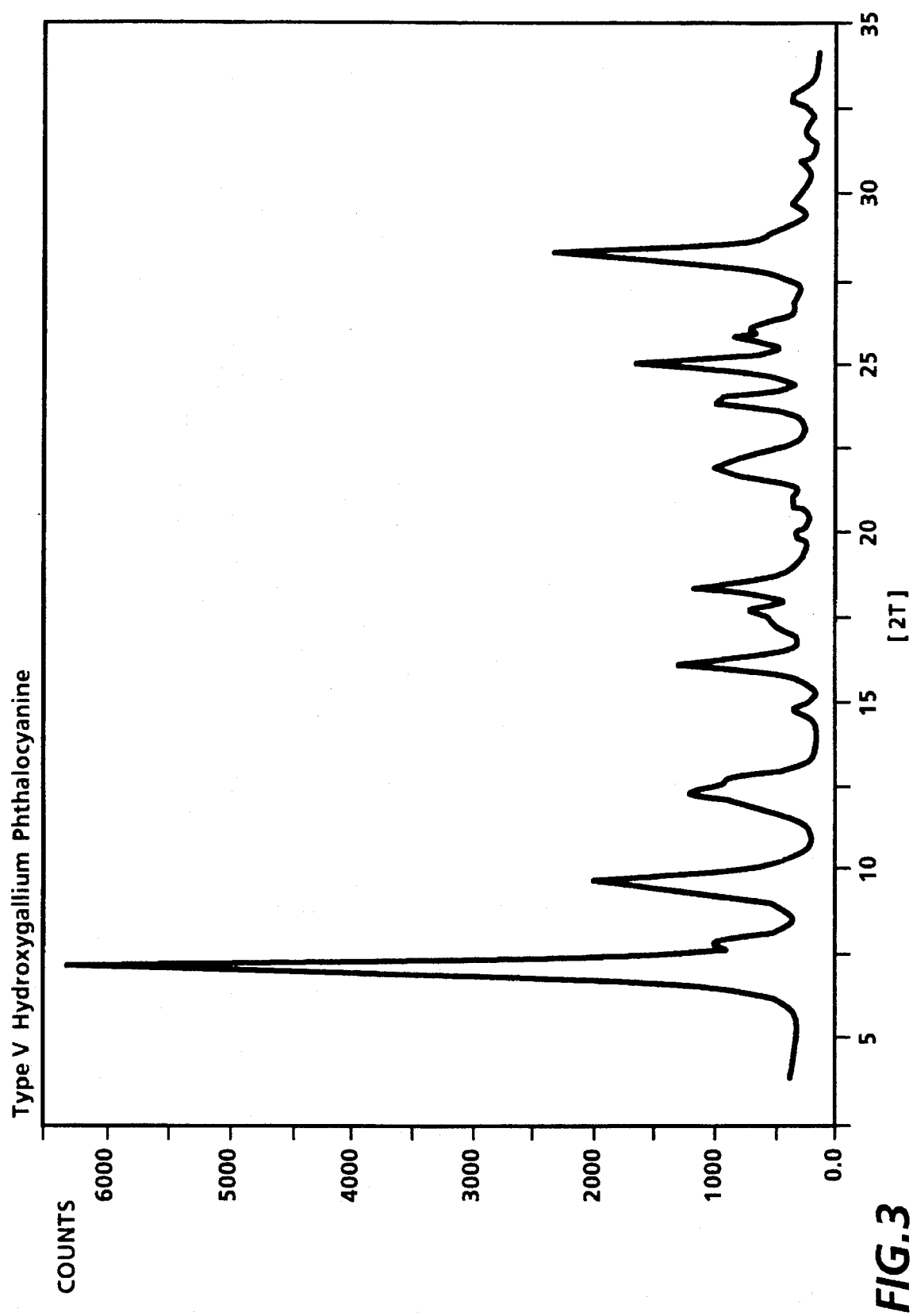
FIG. 3 represents the XRPD of Type V hydroxygallium phthalocyanine having major peaks at 7.4, 9.8, 12.4, 16.2, 17.6, 18.4, 21.9, 23.9, 25.0, 28.1, and the highest peak at 7.4 degrees 2Θ prepared as described in Example VII, for which the pigment precursor, chlorogallium phthalocyanine Type I, was prepared as described in Example I.

Synthesis of Type I Chlorogallium Phthalocyanine (4 $DI^3$/GACL$_3$/NMP):

A 250 milliliter three-necked flask fitted with mechanical stirrer, condenser and thermometer maintained under an atmosphere of argon was charged with 1,3-diiminoisoindolene (16 grams—0.11 mole), gallium chloride (5.0 grams—0.0284 mole; available from Aldrich Chemical) and 50 milliliters of N-methylpyrrolidone (available from Aldrich Chemical). The resulting mixture was heated and stirred at reflux (202° C.) for 2 hours. The product was cooled to ~150° C., and filtered through a 150 milliliters M-porosity sintered glass funnel which was preheated to approximately 150° C. with boiling DMF, and then washed thoroughly with three portions of 75 milliliters of boiling DMF, followed by three portions of 75 milliliters of DMF at room temperature, and then three portions of 50 milliliters of methanol, thus providing 7.0 grams (41 percent yield) of shiny purple crystals. X-ray diffraction patterns for this intermediate Type I chlorogallium phthalocyanine, hydroxygallium phthalocyanine Type I and the resulting hydroxygallium phthalocyanine Type V obtained are illustrated in FIGS. 1 to 3.

EXAMPLE II

Synthesis of Type 1 Chlorogallium Phthalocyanine ($DI^3$/3 PN/GACL$_3$/NMP)

Figure 4:
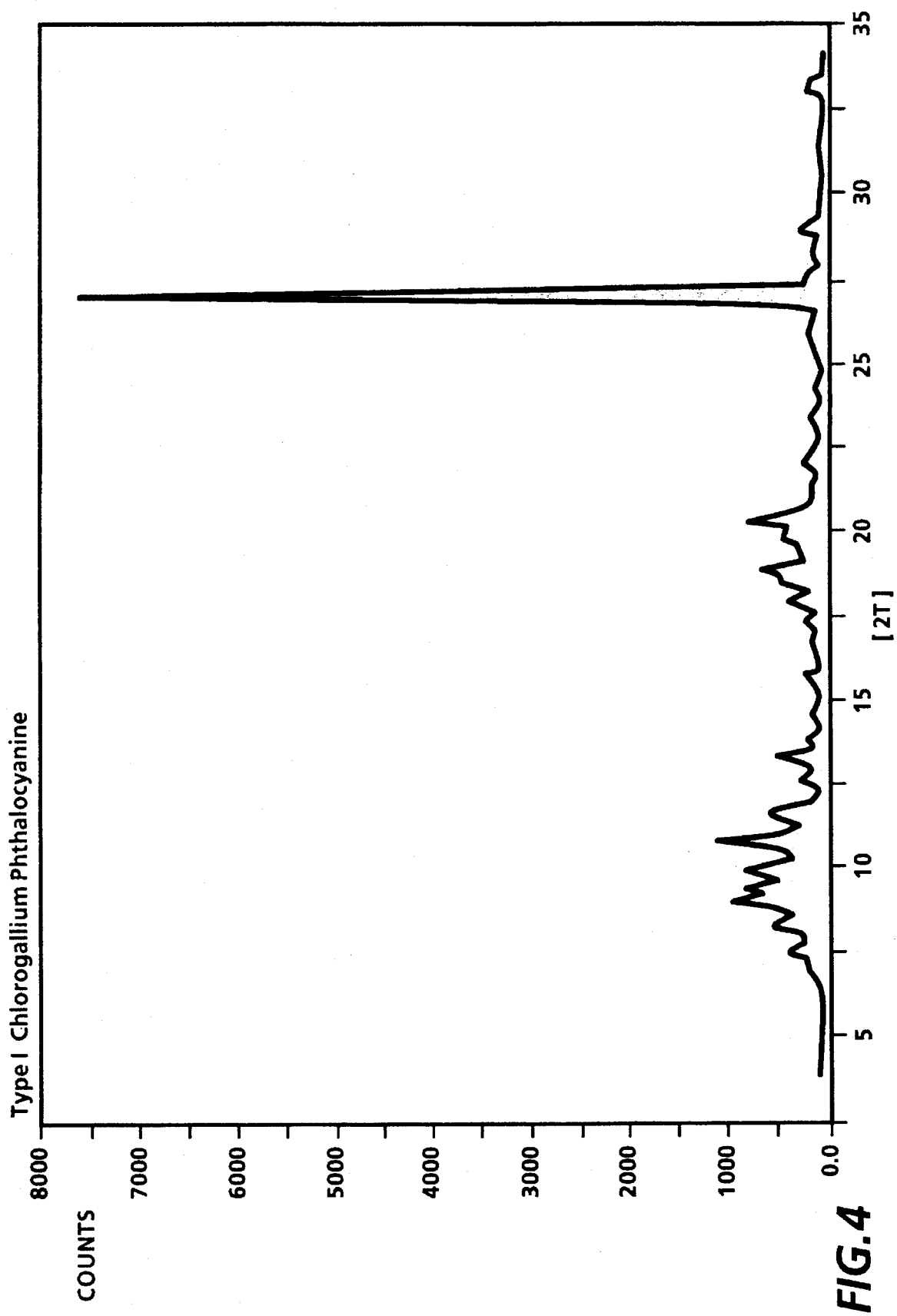
FIG. 4 represents the XRPD of Type I chlorogallium phthalocyanine having major peaks at 9.1, 11.0, 18.8, 20.3, and the highest peak at 27.0 degrees 2(E) prepared as described in Example II.
Figure 5:
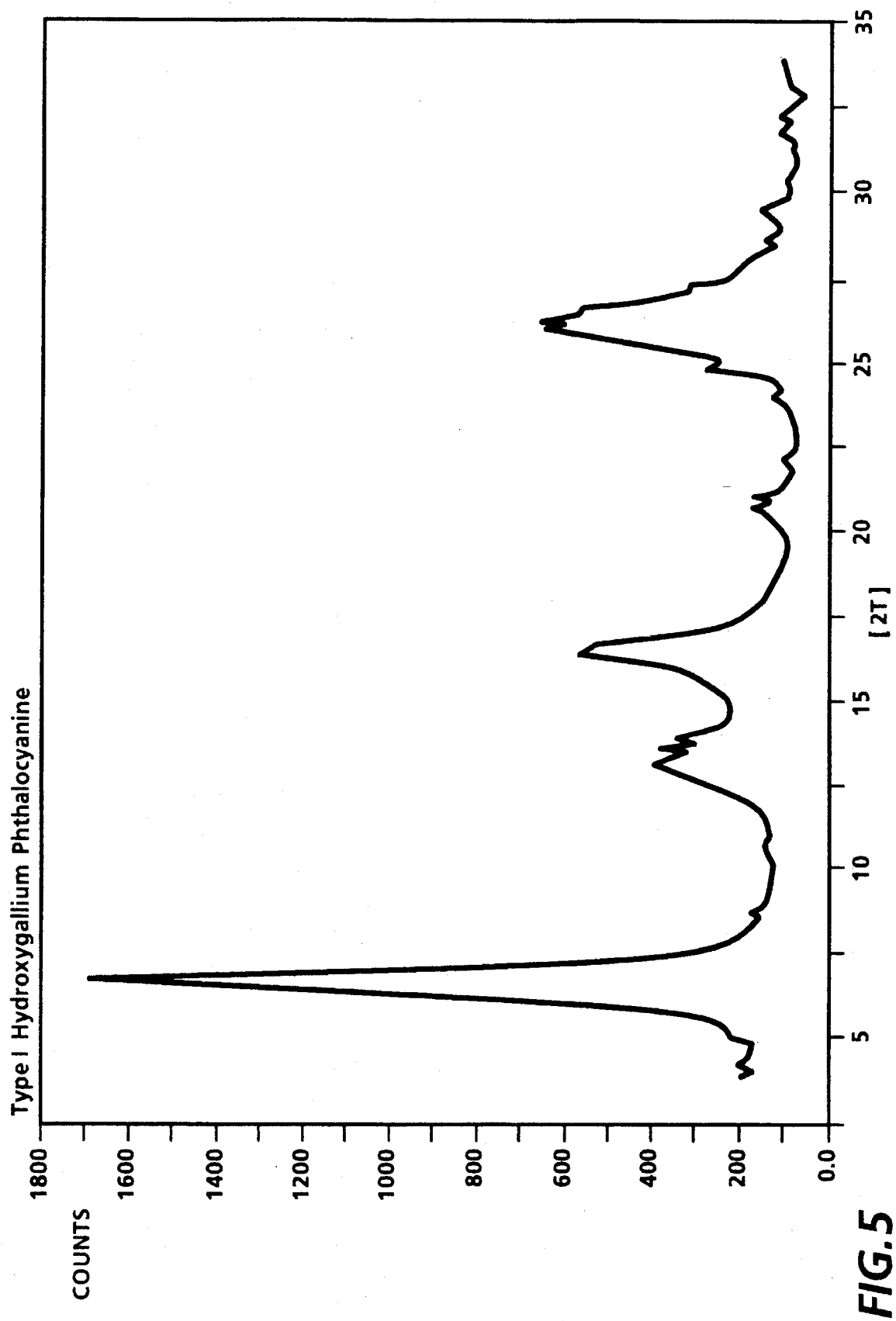
FIG. 5 represents the XRPD of Type I hydroxygallium phthalocyanine having major peaks at 6.9, 13.1, 16.4, 21.0, 26.4, and the highest peak at 6.9 degrees 2Θ prepared as described in Example VI, for which the pigment precursor, chlorogallium phthalocyanine Type I, was prepared as described in Example II.
Figure 6:
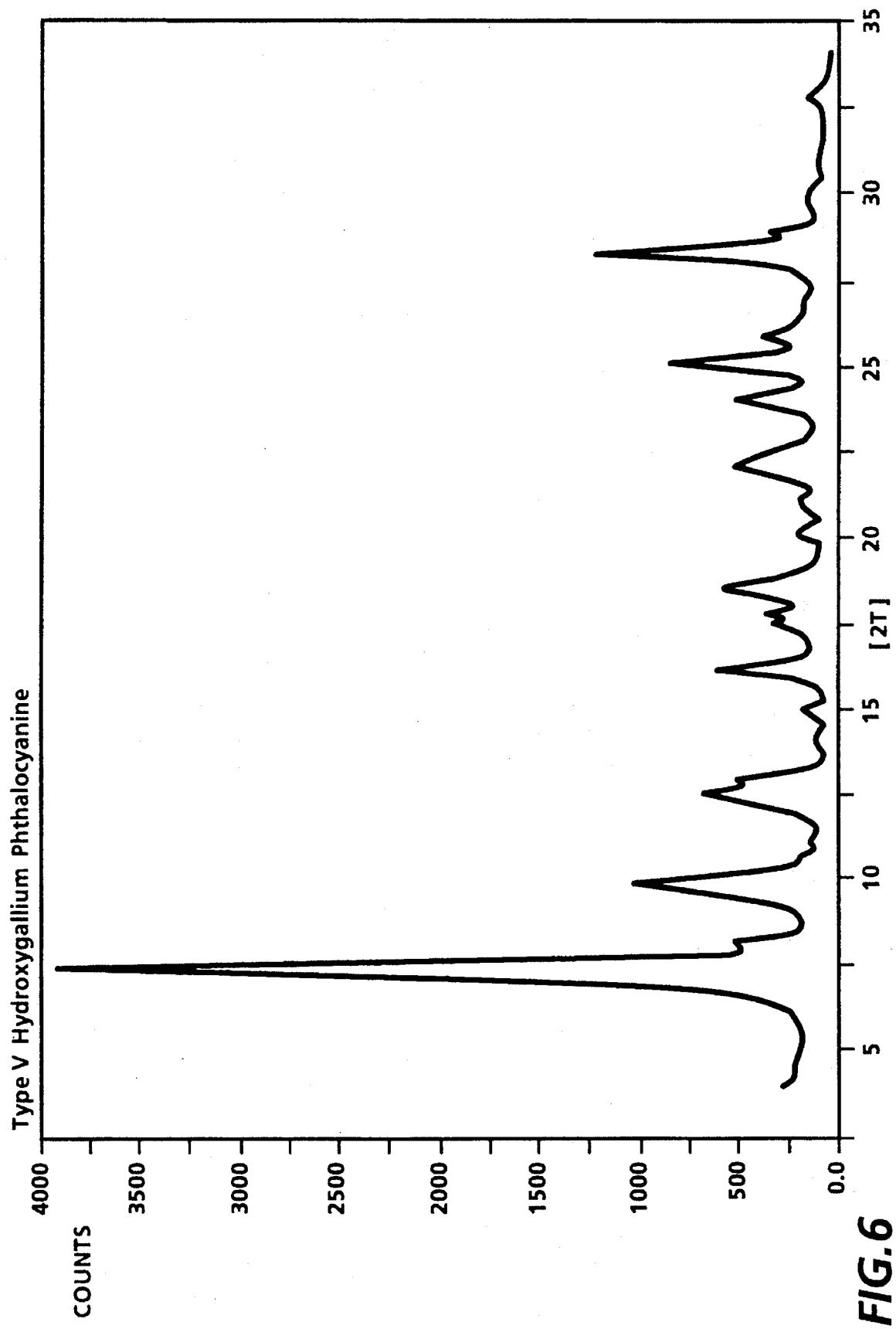
FIG. 6 represents the XRPD of Type V hydroxygallium phthalocyanine having major peaks at 7.4, 9.8, 12.4, 16.2, 17.6, 18.4, 21.9, 23.9, 25.0, 28.1, and the highest peak at 7.4 degrees 2Θ prepared as described in Example VII, for which the pigment precursor, chlorogallium phthalocyanine Type I, was prepared as described in Example II.

A 500 milliliter three-necked flask fitted with mechanical stirrer, condenser and thermometer maintained under an atmosphere of argon was charged with 1,3-diiminoisoindolene $DI^3$ (20.0 grams—0.138 mole), o-phthalonitrile (Pn) (53.0 grams—0.421 mole), gallium chloride (25.0 grams —0.142 mole; Aldrich Chemical) and 250 milliliters of N-methylpyrrolidone (Aldrich Chemical). The mixture was heated and stirred at reflux (202° C.) for 4 hours. The product was cooled to ~150° C., and filtered through a 300 milliliter M-porosity sintered glass funnel which was preheated to approximately 150° C. with boiling DMF, and then washed thoroughly with three portions of 150 milliliters of boiling DMF, followed by three portions of 150 milliliters of DMF at room temperature, and then three portions of 100 milliliters of methanol, thus providing 38.6 grams (45 percent yield) of shiny purple crystals. X-ray diffraction patterns for the intermediate Type I chlorogallium phthalocyanine, hydroxygallium phthalocyanine Type I and hydroxygallium phthalocyanine Type V obtained therefrom are illustrated in FIGS. 4 to 6.

EXAMPLE III

Synthesis of Type I Chlorogallium Phthalocyanine (2 $DI^3$/2Pn/GaCl$_3$/NMP)

A 500 milliliter three-necked flask fitted with mechanical stirrer, condenser and thermometer maintained under an atmosphere of argon was charged with 1,3-diiminoisoindolene (40.6 grams—0.280 mole), o-phthalonitrile (35.9 grams—0,280 mole), gallium chloride (25.0 grams— 0.142 mole; Aldrich Chemical) and 250 milliliters of N-methylpyrrolidone (NMP); Aldrich Chemical). The mixture was heated and stirred at reflux (202° C.) for 4 hours. The product was cooled to ~ 150° C., and filtered through a 300 milliliters M-porosity sintered glass funnel which was preheated to approximately 150° C. with boiling DMF, and then washed thoroughly with three portions of 150 milliliters of boiling DMF, followed by three portions of 150 milliliters DMF at room temperature, and then three portions of 100 milliliters of methanol, thus providing 61.0 grams (71 percent yield) of shiny purple crystals, identified by X-ray diffraction as being Type I chlorogallium phthalocyanine.

EXAMPLE IV

Synthesis of Type I Chlorogallium Phthalocyanine
(4 DI$^3$/GaCl$^3$/ClNp)

A 250 milliliter three-necked flask fitted with mechanical stirrer, condenser and thermometer maintained under an atmosphere of argon was charged with 1,3-diiminoisoindolene (16 grams—0.11 mole), gallium chloride (5.0 grams—0.0284 mole; Aldrich Chemical) and 50 milliliters of 1-chloronaphthalene; BDH Chemical). The mixture was heated and stirred at reflux (202° C.) for 2 hours. The product was cooled to ~150° C., and filtered through a 150 milliliter M-porosity sintered glass funnel, which was preheated to approximately 150° C. with boiling DMF, and then washed thoroughly with three portions of 75 milliliters of boiling DMF, followed by three portions of 75 milliliters of DMF at room temperature, and then three portions of 50 milliliters of methanol, thus providing 7.0 grams (41 percent yield) of shiny purple crystals. These crystals were identified as Type I chlorogallium phthalocyanine on the basis of its X-ray diffraction pattern.

EXAMPLE V

Synthesis of Type I Chlorogallium Phthalocyanine
(4 Pn/GaCl$_3$/ClNp)

Figure 7:
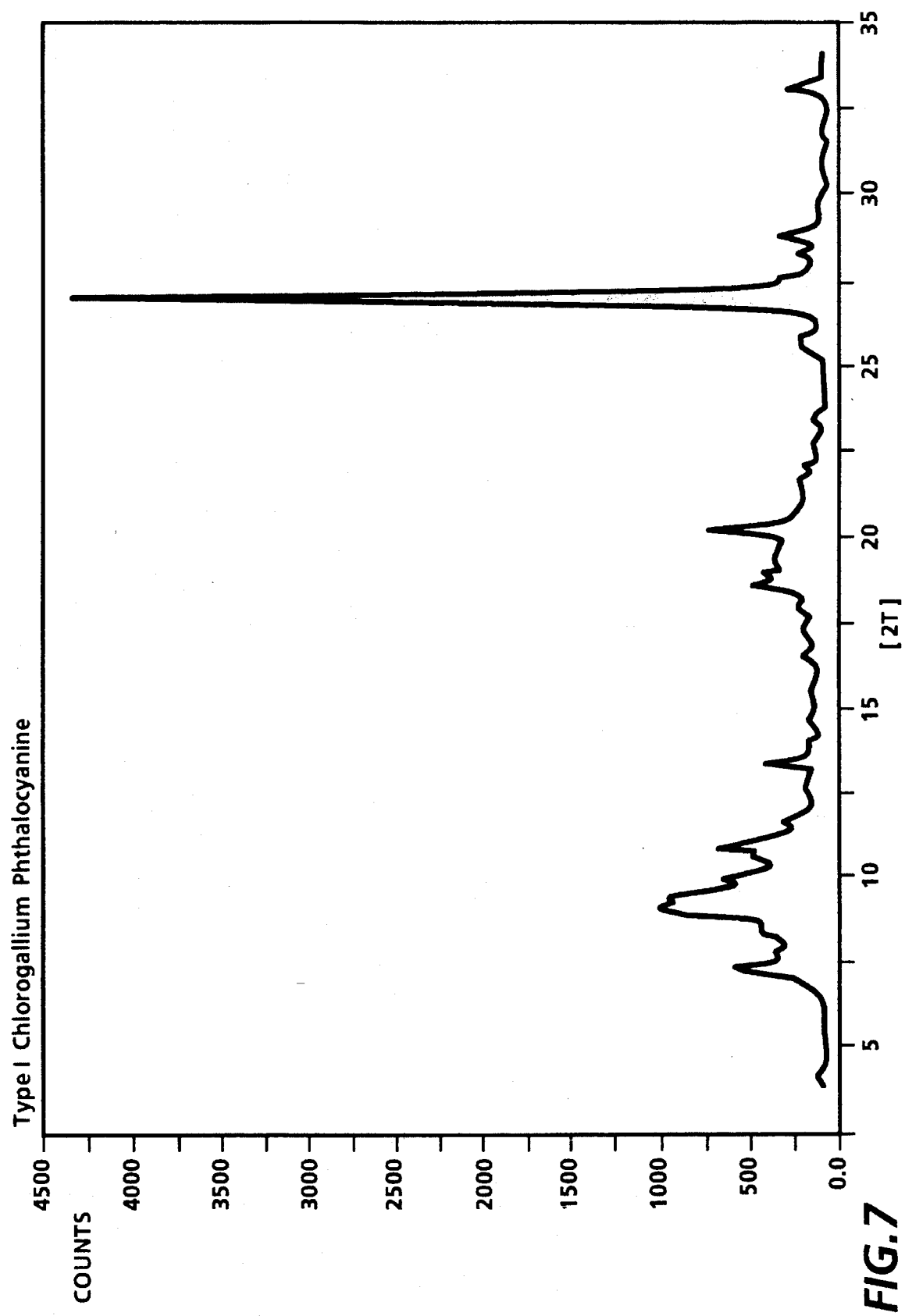
FIG. 7 represents the XRPD of Type I chlorogallium phthalocyanine having major peaks at 9.1, 11.0, 18.8, 20.3, and the highest peak at 27.0 degrees 2Θ prepared as described in Example V.
Figure 8:
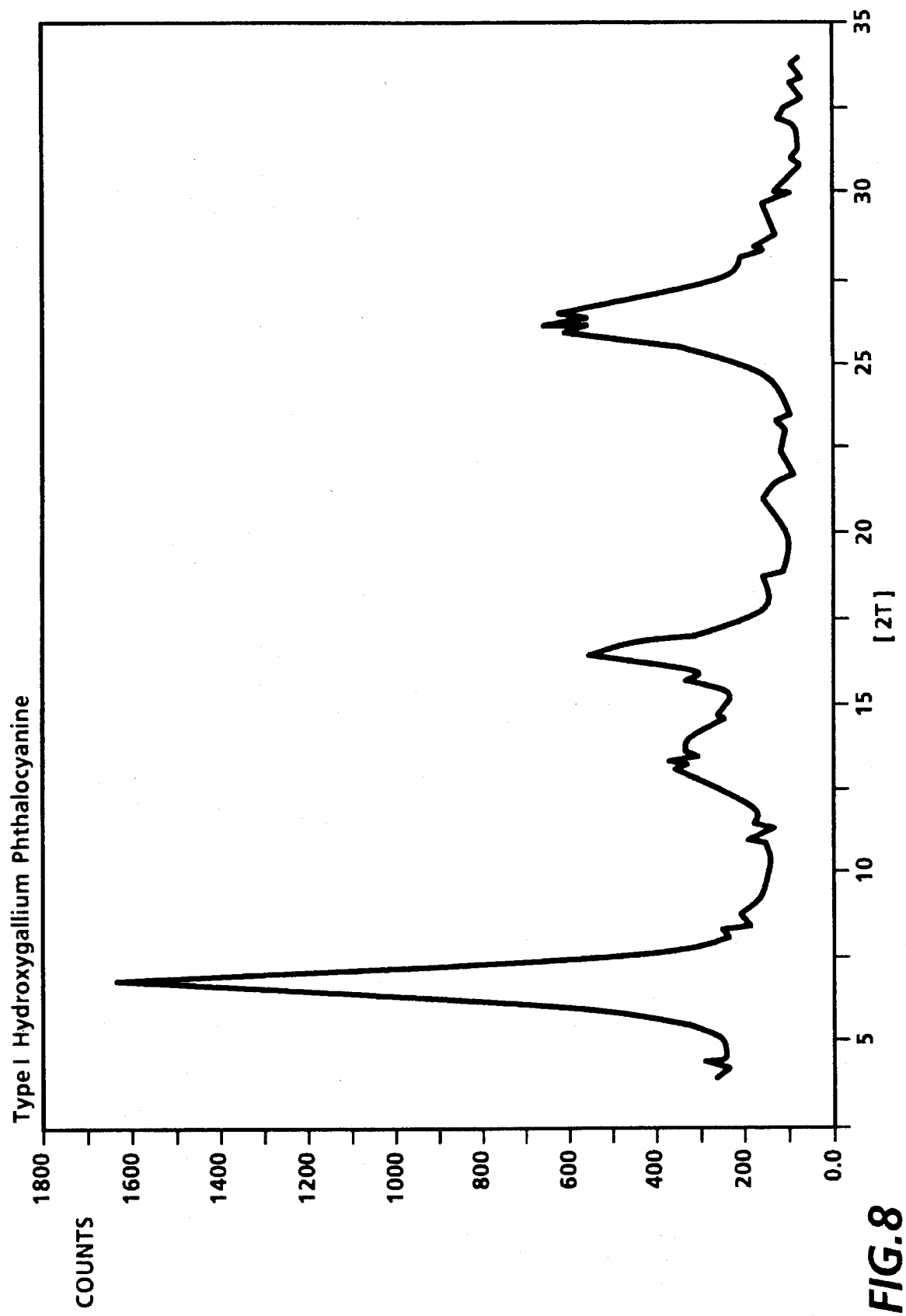
FIG. 8 represents the XRPD of Type I hydroxygallium phthalocyanine having major peaks at 6.9, 13.1, 16.4, 21.0, 26.4, and the highest peak at 6.9 degrees 2Θ prepared as described in Example VI, for which the pigment precursor, chlorogallium phthalocyanine Type I, was prepared as described in Example V.
Figure 9:
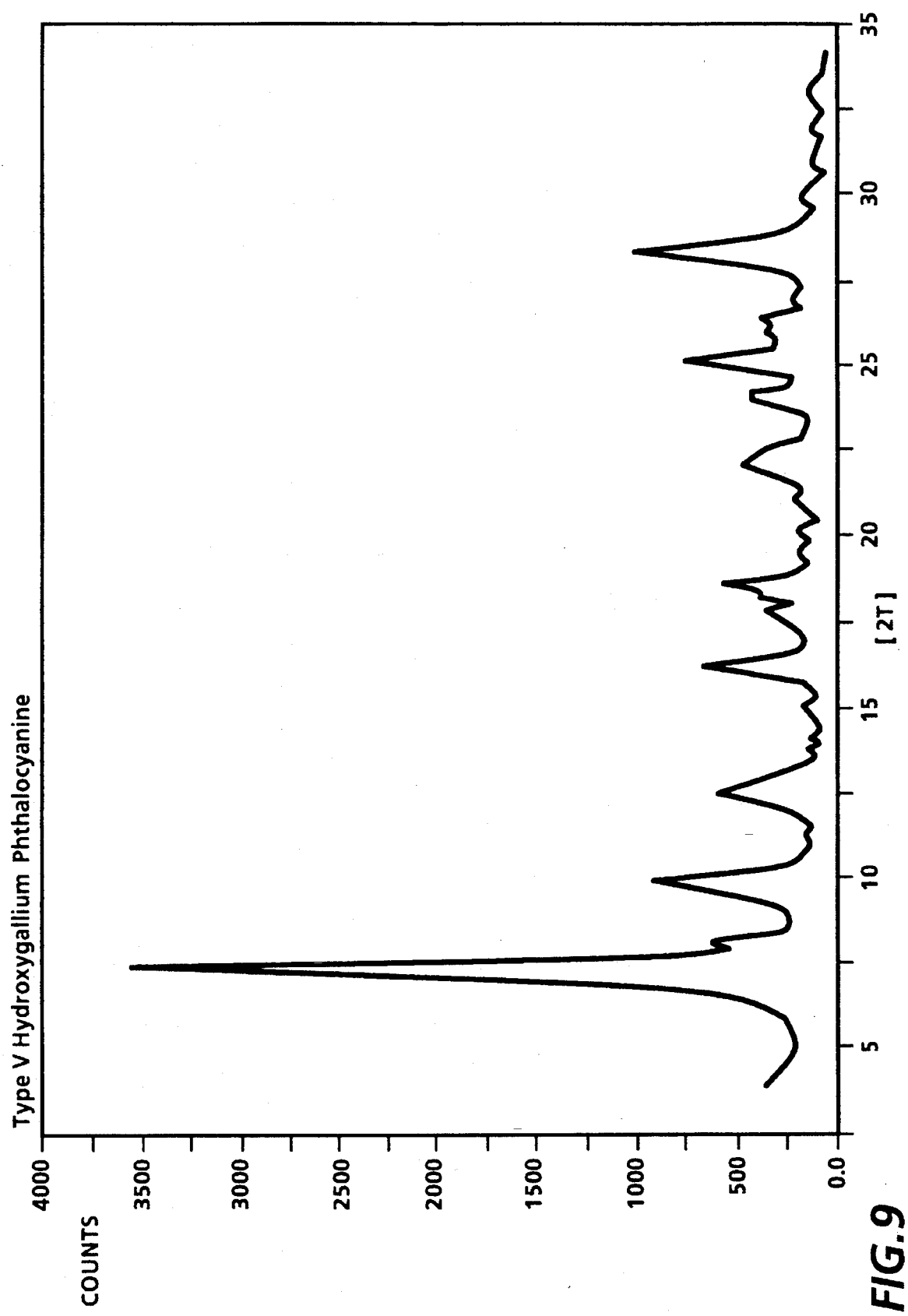
FIG. 9 represents the XRPD of Type V hydroxygallium phthalocyanine having major peaks at 7.4, 9.8, 12.4, 16.2, 17.6, 18.4, 21.9, 23.9, 25.0, 28.1, and the highest peak at 7.4 degrees 2Θ prepared as described in Example VII, for which the pigment precursor, chlorogallium phthalocyanine Type I, was prepared as described in Example V.
Figure 10:
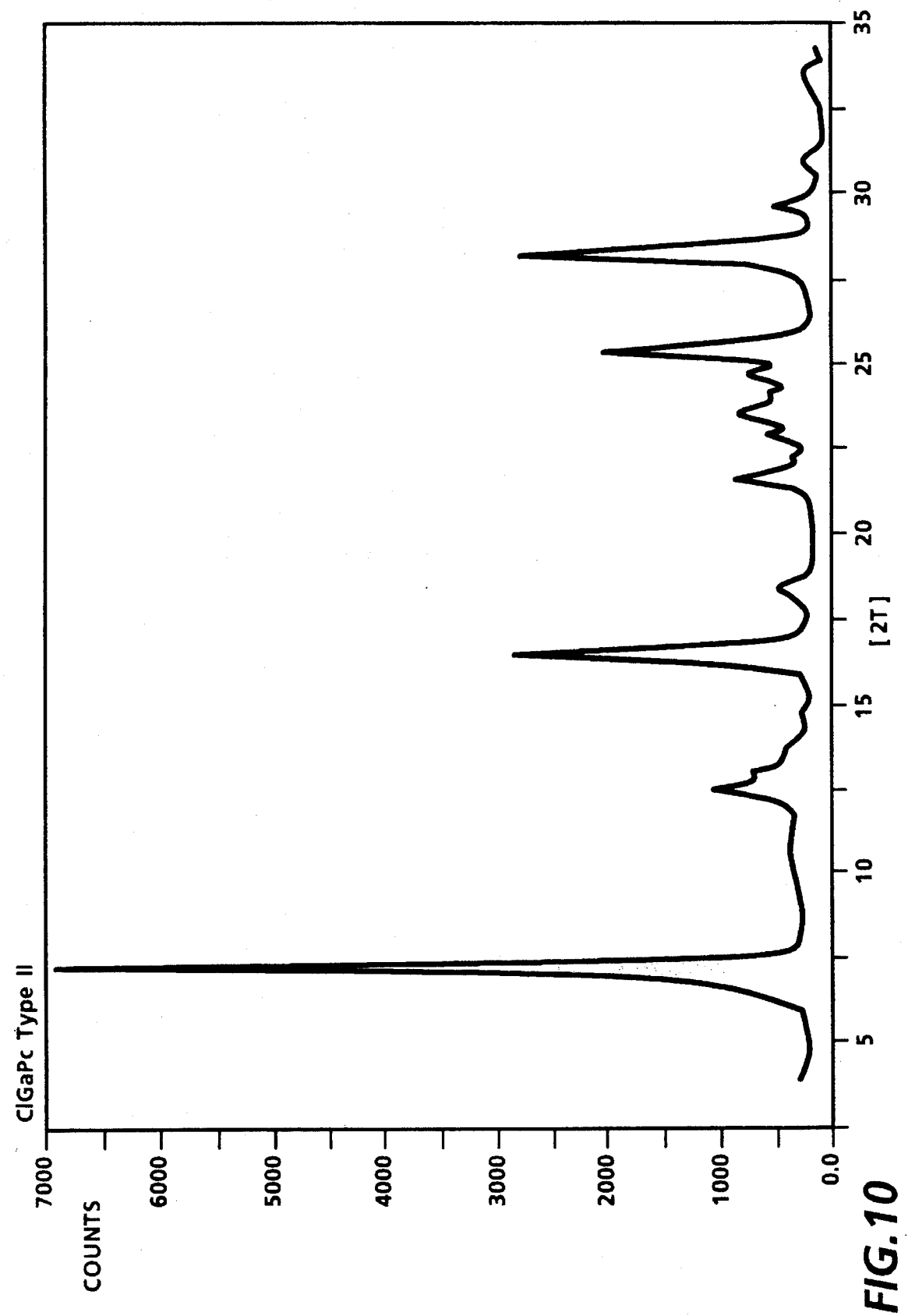
FIG. 10 represents the XRPD of Type II chlorogallium phthalocyanine having major peaks at 7.3, 12.5, 16.5, 21.7, 23.5, 25.4, 28.2, and the highest peak at 7.3 degrees 2Θ.

A 250 milliliter three-necked flask fitted with mechanical stirrer, condenser and thermometer maintained under an atmosphere of argon was charged with o-phthalonitrile (14.1 grams—0.11 mole; BASF unpurified), gallium chloride (5.0 grams—0.0284 mole; Aldrich Chemical) and 50 milliliters of 1-chloronaphthalene (BDH Chemical). The mixture was heated and stirred at 200° C. for 4 hours. The product was cooled to ~150° C., and filtered through a 150 milliliters M-porosity sintered glass funnel, which was preheated to approximately 150° C. with boiling DMF, and then washed thoroughly with three portions of 75 milliliters of boiling DMF, followed by three portions of 75 milliliters DMF at room temperature, and then three portions of 50 milliliters of methanol, thus providing 10.4 grams (61 percent yield) of shiny purple crystals. X-ray diffraction patterns for the precursor pigment chlorogallium phthalocyanine Type I as well as hydroxygallium phthalocyanine Type I and hydroxygallium phthalocyanine Type V prepared from the aforementioned precursor are shown in FIGS. 7 to 9.

EXAMPLE VI

Hydrolysis of the Precursor

Sulfuric acid (125 grams) was heated to 40° C. in a 125 milliliter Erlenmeyer flask. To the heated acid was added 5 grams of the purple crystal pigment precursor chlorogallium phthalocyanine Type I prepared as described in Example I. Addition of the solid was completed over a period of approximately 15 minutes, during which time the temperature of the solution increased to about 47° C. to 48° C. The acid solution was then stirred for 2 hours at 40° C., at which time it was added in a dropwise fashion to a mixture comprised of concentrated (~33 percent) ammonia (265 milliliters) and deionized water (435 milliliters), which had been cooled to a temperature below 5° C. Addition of the dissolved pigment was completed over the course of approximately 30 minutes, during which time the temperature of the solution increased to about 35° C. to 40° C. The reprecipitated pigment was then removed from the cooling bath, and allowed to stir at room temperature for 1 hour. The resulting pigment was then filtered through a porcelain funnel fitted with a Whatman 934-AH grade glass fiber filter. The resulting blue pigment was redispersed in fresh deionized water by stirring at room temperature for 1 hour, and filtered as before. This process was repeated three times until the conductivity of the filtrate was less than 20 μS. The filter cake was oven dried overnight at 50° C. to provide 4.75 grams (95 percent) of a dark blue solid, identified by X-ray diffraction as being Type I hydroxygallium phthalocyanine.

EXAMPLE VII

Conversion to Type V OHGaPc

The pigment product of Example VI, Type I hydroxygallium phthalocyanine (3.0 grams) was added to 45 milliliters of N,N-dimethylformamide (BDH Assured) in a 120 milliliter glass bottle containing 90 grams of glass beads (1 millimeters diameter). The bottle was sealed and placed on a ball mill overnight (16 to 24 hours). The resulting solid was isolated by filtration through a porcelain funnel fitted with a Whatman GF/F grade glass fiber filter, and washed in the filter using five portions of n-butyl acetate (50 milliliters) (BDH Assured). The filter cake was oven dried overnight, about 18 hours, at 50° C., to provide 2.8 grams (93 percent) of a dark blue solid, which was identified as Type V hydroxygallium phthalocyanine by XRPD with major peaks at 7.4, 9.8, 12.4, 16.2, 17.6, 18.4, 21.9, 23.9, 25.0, 28.1, and the highest peak at 7.4 degrees 2Θ.

The hydroxygallium phthalocyanines Type V can be selected as photogenerating layers for layer imaging members, including Devices 1 and 2 of the Table, prepared by the following procedure. An aluminized MYLAR® substrate, about 4 mil in thickness, was coated with a silane/zirconium alkoxide solution, prepared by mixing 6.5 grams of acetylacetonate tributoxy zirconium (ZC540), 0.75 gram of trimethoxysilane (A 1110), 28.5 grams of isopropyl alcohol, and 14.25 grams of butanol using a number 5 wire wound rod applicator. This layer was dried at 140° C. for 20 minutes; the final thickness was measured to be 0.1 micron. A dispersion of the hydroxygallium phthalocyanine, that is HOGaPc Type V, was prepared by combining 0.35 gram of the HOGaPc prepared as described in Example VII from a precursor pigment, which was prepared as described in Example I, and 0.26 gram of poly(vinyl butyral) in 25.21 grams of chlorobenzene in a 60 milliliter glass jar containing 70 grams of 0.8 millimeter glass beads. The dispersion was shaken on a paint shaker for 2 hours then was coated onto the silane/zirconium layer described above using a number 6 wire wound applicator. The formed photogenerating layer HOGaPc Type V was dried at 100° C. for 10 minutes to a final thickness of about 0.20 micron.

Hole transporting layer solutions were prepared by dissolving 5.4 grams of N,N'-diphenyl-N,N-bis(3-methyl phenyl)-1,1'-biphenyl-4,4'-diamine, and 8.1 grams of polycarbonate in 61.5 grams of chlorobenzene. One solution was coated onto the HOGaPc Type V generator layer using a 10 mil film applicator. The charge transporting layer thus obtained was dried at 115° C. for 60 minutes to provide a final thickness of about 28 microns.

The resulting imaging member had a dark decay of 10 to 15 volts per second, $E_{1/2}=1.67$ ergs/cm$^2$ and $E_{7/8}=3.96$ ergs/cm$^2$. Excellent xerographic cycling characteristics were also measured $\Delta V_{ddp}=-50$ volts after 10,000 standard cycles were repeated, or $\Delta V_{ddp}=-70$ volts after 5,000 cycles under stress.

In the standard cycling test, devices were charged with a corotron to about −800 volts. They were exposed with 775 nanometers of light with an intensity of about 7 ergs/cm$^2$ and erased with white light of about 60 ergs/cm$^2$. The dark development ($V_{ddp}$) and background ($V_{bg}$) potentials were measured and recorded while the testing was performed for 10,000 cycles. After the standard cycling test had been completed, the devices were retained in the darkened drum scanner for about 20 hours. After charging the device or prepared photoconductive imaging member to about −800 volts with a corotron, it was exposed with 775 nanometers of light with an intensity of 3 ergs/cm$^2$ and erased with white light of about 200 ergs/cm$^2$. The dark development and background potentials were measured and recorded while the testing was performed for 5,000 cycles. The significantly higher erase light intensity used in this second test compared to the standard test accelerates the cycledown (decrease in the dark development potential) in the photogenerator and is thus considered a stress test.

The xerographic electrical properties of photoresponsive imaging members prepared as described above were determined by electrostatically charging the surface thereof with a corona discharge source until the surface potential, as measured by a capacitatively coupled probe attached to an electrometer, attained an initial dark value, $V_0$, of −800 volts. After resting for 0.5 second in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect was observed. The dark decay in volts per second was calculated as $(V_0-V_{ddp})/0.5$. The percent of photodischarge was calculated as $100\times (V_{ddp}-V_{bg})V_{ddp}$. The half exposure energy, that is $E_{1/2}$, is the amount of exposure energy causing reduction of the $V_{ddp}$ to half of its initial value, and the $E_{800-100}v$ is the amount of exposure energy causing reduction of the $V_{ddp}$ from initial 800 volts to final 100 volts were determined. The wavelength of light selected was 780 nanometers.

In the Table that follows there are presented information and data for layered imaging members identified as Device numbers CK561, CK593, CK774, and CK773, which members are comprised of the components illustrated in the above Example. Devices CK561, CK593, CK774, and CK773 are thus comprised of equivalent components for the data presented, except for the preparation of Type V, which is as indicated by Synthetic Route. NMP refers to N-methyl pyrrolidone, and ClNp refers to 1-chloronaphthalene.

TABLE

| | SENSITIVITY AND CYCLING DATA | | | |
|---|---|---|---|---|
| CRITERIA | (OH)GaPc (V) 26064-11A | (OH)GaPc (V) 26054-48 | (OH)GaPc (V) 26054-93 | (OH)GaPc (V) 26054-92 |
| Device No. | CK561 | CK593 | CK774 | CK773 |
| Synthetic Route to ClGaPc Intermediate | Pn + GaCl$_3$ in ClNP | DI$^3$ + GaCl$_3$ in NMP | (2DI$^3$ + 2 Pn) + GaCl$_3$ in NMP | (DI$^3$ + 3 Pn) + GaCl$_3$ in NMP |
| Dark Decay (−V/sec) | 17.8 | 13 | 17 | 13 |
| S (V · cm$^2$/ergs) | 329 | 269 | 286 | 295 |
| E$_{1/2}$ (ergs/cm$^2$) (780 nm) | 1.31 | 1.67 | 1.53 | 1.52 |
| E$_{7/8}$ V$_{800-100}$ (ergs/cm$^2$) (780 nm) | 2.91 | 3.96 | 3.34 | 3.34 |
| $\Delta V_{ddp}$ (−V) 10K Cycles | −72 | −50 | −71 | −43 |
| $\Delta V_{ddp}$ (−V) 5K Stress Test | −127 | −70 | −102 | −53 |

In embodiments, with Pn, GaCl$_3$ in ClNp, the resulting synthesized chlorogallium phthalocyanine contained 5.74 percent of chlorine, the hydrolyzed OHGaPc contained 0.77 percent of chlorine, and the resulting product hydroxy gallium phthalocyanine Type V contained 0.68 percent of chlorine; which compares with a chlorine content of 5.20, 0.001 and 0.0259, respectively, for ClGaPc, hydrolyzed OHGaPc, and Type V hydroxygallium phthalocyanine when the initial reactants were DI$^3$, and CaCl$_3$ in NMP. Thus, in embodiments it is preferred that solvents like chloronaphthalene (ClNP) not be selected for the processes of the present invention, primarily since with this solvent undesirable substantial residual chlorine resides in the Type V product, which chlorine can cause poor cycling characteristics and the other disadvantages indicated herein.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for the preparation of hydroxygallium phthalocyanine consisting essentially of the hydrolysis of halogallium phthalocyanine precursor to a hydroxygallium phthalocyanine, and conversion of said resulting hydroxygallium phthalocyanine to Type V hydroxygallium phthalocyanine by contacting said resulting hydroxygallium phthalocyanine with the organic solvent N,N-dimethylformamide, pyridine, dimethylsulfoxide, quinoline, 1-chloronaphthalene, N-methylpyrrolidone, or mixtures thereof, and wherein said hydroxygallium phthalocyanine Type V contains halide in an amount of from about 0.001 percent to about 0.1 percent;

and wherein said precursor halogallium phthalocyanine is obtained by the reaction of gallium halide with diiminoisoindolene in an organic solvent.

2. A process in accordance with claim 1 wherein the phthalocyanine obtained subsequent to hydroylsis is Type I hydroxygallium phthalocyanine.

3. A process in accordance with claim 1 wherein the halogallium phthalocyanine is chlorogallium phthalocyanine Type I, and halide is chloride.

4. A process in accordance with claim 1 wherein the hydrolysis is accomplished by dissolution of the halogallium phthalocyanine in concentrated sulfuric acid, followed by reprecipitation of the resulting dissolved pigment in aqueous ammonia.

5. A process in accordance with claim 1 wherein the conversion is accomplished by heating at a temperature of from about 0° C. to about 100° C. and preferably about 25° C.

6. A process in accordance with claim 1 wherein the organic solvent is a polar aprotic solvent 7. A process in accordance with claim 1 wherein there is obtained hydroxygallium phthalocyanine Type V with a chlorine content of from about 0.001 to about 0.1 percent, and with major peaks at 7.4, 9.8, 12.4, 16.2, 17.6, 18.4, 21.9, 23.9, 25.0, 28.1 and with the highest peak at 7.4 degrees 2 $\Theta$.

8. A process in accordance with claim 8 wherein there results hydroxygallium phthalocyanine Type V with chlorine levels of from about 0.001 percent to about 0.1 percent of the total weight of said Type V.

9. A process in accordance with claim 1 wherein 1,3-diiminoisoindolene ($DI^3$) is selected as a reactant and is present in an amount of from about 1 part to about 10 parts, and preferably about 4 parts for each part of gallium halide selected, and wherein said halide is chloride.

10. A process in accordance with claim 9 wherein the solvent is N-methylpyrrolidone.

11. A process in accordance with claim 9 wherein the solvent is present in an amount of from about 10 parts to about 100 parts, and preferably about 19 parts for each part of gallium chloride selected.

12. A process in accordance with claim 9 wherein the reactants are heated to a temperature of from about 100° C. to about 200° C., and preferably about 200° C. for a period of time of from about 1 hour to about 24 hours, and preferably about 4 hours.

13. A process in accordance with claim 9 wherein the chlorogallium phthalocyanine is washed with boiling dimethylformamide.

14. A process in accordance with claim 9 wherein hydroxygallium Type V with a chlorine content of from about 0.001 to about 0.1 percent can be obtained by selecting a mixture of $DI^3$ and phthalonitrile, in place of the $DI^3$ alone.

15. A process in accordance with claim 14 wherein the mixture contains from about 0.1 part to about 10 parts and preferably about 1 part of $DI^3$, and from about 0.1 part to about 10 parts, and preferably about 3 parts of phthalonitrile; and wherein the total amount of the two reagents is optionally about 4 parts for each part of gallium halide selected.

16. A process in accordance with claim 2 wherein the organic solvent is N,N-dimethylformamide present in an amount of from about 10 volume parts to about 50 volume parts, and preferably about 15 volume parts for each weight part of hydroxygallium phthalocyanine Type I that is selected.

17. A process in accordance with claim 1 wherein the hydroxygallium Type V obtained is washed in a solvent of acetone, or an aliphatic alcohol, and wherein aliphatic contains from 1 to about 25 carbon atoms.

18. A process in accordance with claim 1 wherein the hydroxygallium Type V obtained is of a small particle size in average volume diameter of from about 0.01 micron to about 0.5 micron, and preferably about 0.03 micron.

19. A process in accordance with claim 1 wherein the precursor is chlorogallium phthalocyanine.

20. A process in accordance with claim 19 wherein there is obtained hydroxygallium Type V with a chlorine content of from about 0.001 percent to about 0.1 percent of the total weight of said Type V.

21. A process for the preparation of hydroxygallium phthalocyanine Type V which comprises the reaction of gallium chloride and 1,3-diiminoisoindolene in the presence of N-methyl pyrrolidone resulting in chlorogallium phthalocyanine Type I; hydrolyzing said chlorogallium phthalocyanine to hydroxy gallium phthalocyanine Type I; and contacting said Type I with N,N-dimethylformamide.

22. A process in accordance with claim 21 wherein the said Type V obtained contains about 0.03 percent of chlorine.

23. A process in accordance with claim 22 wherein the amount of chlorine is from about 0.001 to about 0.1 percent by weight.

24. A process in accordance with claim 1 wherein the precursor is formed in the presence of N-methylpyrrolidone in the organic solvent.

25. A process in accordance with claim 1 wherein a mixture of 1,3-diiminoisoindolene and o-phthalonitrile is selected.

26. A process in accordance with claim 1 wherein the organic solvent for preparation of the precursor is N-methylpyrrolidone and the organic solvent for the conversion to Type V is N,N-dimethylformamide.

27. A process in accordance with claim 8 wherein the chlorine level is about 0.03 percent.

28. A process in accordance with claim 6 wherein the solvent is N-methylpyrrolidone.

\* \* \* \* \*